United States Patent
Watanabe et al.

(10) Patent No.: US 10,740,600 B2
(45) Date of Patent: Aug. 11, 2020

(54) POSTURE ESTIMATION SYSTEM, POSTURE ESTIMATION DEVICE AND RANGE IMAGE CAMERA

(71) Applicant: Hitachi, Ltd., Chiyoda-ku, Tokyo (JP)

(72) Inventors: Akinobu Watanabe, Tokyo (JP); Katsuyuki Nakamura, Tokyo (JP); Yasuyuki Mimatsu, Tokyo (JP); Toshio Kamimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 131 days.

(21) Appl. No.: 16/126,662

(22) Filed: Sep. 10, 2018

(65) Prior Publication Data
US 2019/0102613 A1 Apr. 4, 2019

(30) Foreign Application Priority Data
Sep. 29, 2017 (JP) .................................. 2017-189994

(51) Int. Cl.
*G06K 9/00* (2006.01)
*G06F 3/01* (2006.01)
(Continued)

(52) U.S. Cl.
CPC .......... *G06K 9/00342* (2013.01); *G06F 3/011* (2013.01); *G06T 7/11* (2017.01);
(Continued)

(58) Field of Classification Search
CPC .......... G06K 9/00342; G06K 9/00362; G06K 9/00335; G06T 7/70; G06T 7/11;
(Continued)

(56) References Cited

U.S. PATENT DOCUMENTS

| 8,295,546 B2 | 10/2012 | Craig et al. |
| 2010/0197390 A1* | 8/2010 | Craig ................. G06K 9/00369 463/30 |

(Continued)

FOREIGN PATENT DOCUMENTS

JP 2017097577 * 5/2017

*Primary Examiner* — Nizar N Sivji
(74) *Attorney, Agent, or Firm* — Crowell & Moring LLP

(57) ABSTRACT

The present invention discloses a posture estimation system including a range image camera for acquiring and outputting range image and an attitude estimation device connected via the network to the range image camera. The range image camera includes a range image sensor, a range image generator that extracts a region including foreground pixels from the input range image acquired from the range image sensor and generates a range image including the extracted area, a first posture estimator that estimates a first joint position from the range image, and a first communicator that transmits the range image and the estimated first joint position. The posture estimating device includes a second communicator that receives the range image from the range image camera and the first joint position, a range image receiver that receives the range image via the second communicator, a posture estimator that estimates recognizes a second joint position different from the first joint position based on the range image received by the range image receiving unit, and generates estimated posture information based on the first joint position and the second joint position, and an outputter that outputs the generated estimated attitude information, wherein the first communicator sends a range image used for extracting the second joint position to the network.

8 Claims, 26 Drawing Sheets

(51) Int. Cl.
  *G06T 7/194* (2017.01)
  *G06T 7/70* (2017.01)
  *G06T 7/11* (2017.01)

(52) U.S. Cl.
  CPC ............... *G06T 7/194* (2017.01); *G06T 7/70* (2017.01); *G06T 2207/10028* (2013.01); *G06T 2207/30196* (2013.01)

(58) Field of Classification Search
  CPC ........... G06T 7/194; G06T 2207/30196; G06T 2207/10028; G06F 3/011
  See application file for complete search history.

(56) References Cited

U.S. PATENT DOCUMENTS

2018/0011543 A1* 1/2018 Funami .................... G06F 3/012
2019/0188488 A1* 6/2019 Ito .......................... G06T 7/536

* cited by examiner

FIG. 12

| Xd39 | Yd39 | Zd39 | Pd39 |
|---|---|---|---|
| Xd40 | Yd40 | Zd40 | Pd40 |
| Xd41 | Yd41 | Zd41 | Pd41 |
| Xd42 | Yd42 | Zd42 | Pd42 |
| Xd43 | Yd43 | Zd43 | Pd43 |
| X... | Y... | Z... | P... |
| X... | Y... | Z... | P... |
| X... | Y... | Z... | P... |
| X... | Y... | Z... | P... |
| X... | Y... | Z... | P... |
| X... | Y... | Z... | P... |
| X... | Y... | Z... | P... |
| X... | Y... | Z... | P... |
| X... | Y... | Z... | P... |
| X... | Y... | Z... | P... |
| X... | Y... | Z... | P... |
| Xdx | Ydx | Zdx | Pdx |

POSTURE ESTIMATION SYSTEM, POSTURE ESTIMATION DEVICE AND RANGE IMAGE CAMERA

This invention relates to a posture estimation system, a posture estimation device and a range image camera.

BACKGROUND

A technique to estimate object joint positions and a posture of human beings and so on using range image (also referred to as "depth image") which acquired from range image sensors is known.

For example, computer game system recognizing the motion of players with a depth camera is described in PTL 1.

The computer system as described in Patent Document 1 is based on the premise that it has sufficient computing performance for processing the distance image sent from one depth camera.

CITATION LIST

Patent Literature

[PTL 1] U.S. Pat. No. 8,295,546

SUMMARY OF INVENTION

Technical Problem

In the meantime, by the way, a computing system is expected, the computing system includes a large number of range image cameras installed in various place and remote sever devices connected to the range image cameras through a network, and the remote sever devices carry out target posture estimation based on the received each range image received from the each range image camera.

For example, a monitoring system is considered, the monitoring system is configured to recognize a person's action by using analysis technology of analysis image, and aims at improving production efficiency and reducing defectives as well as analyzing customers action and monitoring employees.

In such the computing system has technical problems like increasing the communication load of the network and the processing load of the remote server devices caused by a large quantity of range image data.

Or there is another problem like having to prepare high performance computers.

In addition, it is necessary to improve the method of the posture estimation that remote server devices perform to process a large quantity of range image data effectively.

An object of the present invention is to reduce the processing load of the computing system performing object posture estimation by using range image sent from range image cameras.

Solution to Problem

One example of the present invention is that a posture estimation system comprising a range image camera for acquiring and outputting range image and an attitude estimation device connected via the network to the range image camera,
the range image camera is comprising;
a range image sensor;
a range image generator that extracts a region including foreground pixels from the input range image acquired from the range image sensor and generates a range image including the extracted area;
a first posture estimator that estimates a first joint position from the range image; and
a first communicator that transmits the range image and the estimated first joint position, the posture estimating device is comprising;
a second communicator that receives the range image from the range image camera and the first joint position,
a range image receiver that receives the range image via the second communicator,
a posture estimator that estimates recognizes a second joint position different from the first joint position based on the range image received by the range image receiving unit, and generates estimated posture information based on the first joint position and the second joint position, and
an outputter that outputs the generated estimated attitude information,
wherein the first communicator sends a range image used for extracting the second joint position to the network.

Advantageous Effects of Invention

According to this Invention, the processing load of the computing system performing object posture estimation by using range image sent from range image cameras can be reduced.

BRIEF DESCRIPTION OF DRAWINGS

FIG. 12 is an example of a diagram showing a data format of data of the voxel.

DESCRIPTION OF EMBODIMENTS

Hereinafter, embodiments of the present invention will be described with reference to the drawings.

Embodiment 1

Figure 1:
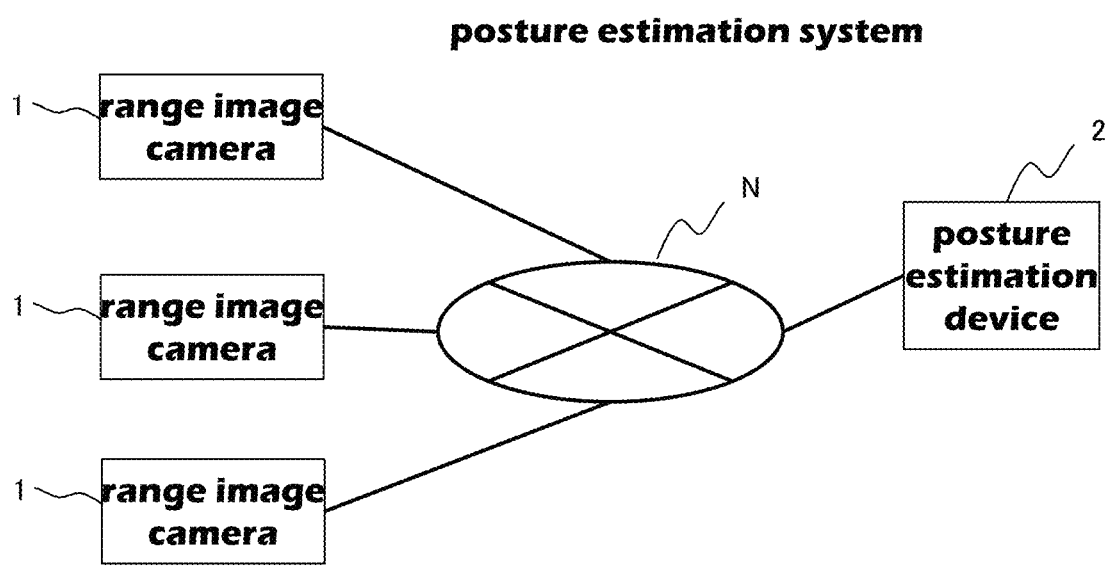
FIG. 1 is a diagram showing an example of a posture estimation system.

FIG. 1 is a diagram showing an example of a posture estimation system.

The posture estimation system includes more than one range image camera 1 and a posture estimation device 2.

Each range image camera 1 is connected to the posture estimation device 2 through network N, and can communicate with each other.

Network N is, for example, electric communications networks such as wire LAN (Local Area Network), wireless LAN, WAN (Wide Area Network), a mobile communications network and the Internet, and two or more of these may be put together.

The range image camera 1 is an imaging device which images range image of a object space where there are the objects such as human beings.

A range image (also referred to as "a depth image") is a image that range information in depth direction in predetermined scaling and gray scale information (e.g., RGB) have been recorded in each pixel of the image.

For example, a range image camera 1 is a camera of the TOF (Time of Flight) method, but if the camera can output a range image, it may be camera of other methods such as stereo camera having two optical systems for imaging with visible light.

In addition, the range image camera is also referred to as a range image sensor.

The range image camera 1 in this embodiment removes background from the range image by setting predetermined value (e.g., "1") for a gray scale information of background pixels and range information, and sends the range image including foreground pixels to a posture estimation device 2.

Foreground pixels are a group of pixels corresponding to objects to move such as persons or tools which the persons are holding.

Background pixels are pixels except for the foreground pixels and are a group of pixels corresponding to the background.

The posture estimation device 2 is a device estimating postures of the objects like persons from the foreground pixels included in the range image.

The posture estimation device 2 is, for example, implemented by a computer device like server as will be described later.

The posture estimation device 2 may be implemented by several computers.

The posture estimation device 2 in this embodiment recognizes parts constituting the object (for example, the "parts" don't include parts of a body like head, arms, hands and the trunk, and joints) based on the range information of the foreground pixels included in the range image, recognizes the positions of the joints corresponding to each part and estimates posture of the object based on the recognized joint position.

In this embodiment, the range image camera 1 removes background from the range image and the range image camera estimates posture estimation internally based on the range image. The posture information including joint coordinates and only a part of the foreground pixels are sent to the posture estimation device 2 as the estimation results.

In this way, communication load of the network N is reduced compared with a case of sending general range image including both background pixels and foreground pixels.

Then, the processing load of the posture estimation device 2 is reduced compared with a case of sending the general range image because the posture estimation device 2 processes the part of the foreground pixels.

In addition, the bigger the number of the range image cameras or the imaging rates of the range camera increases, the more the effect of reduction grows.

In this embodiment, installation conditions of the range image cameras, such as the height from the floor or angle between a vertical axis and a Z-axis of a XYZ camera coordinate system, are set in advance and the installation conditions are input into the range camera 1 or the posture estimation device 2 as initial setting.

For methods of the measurement the installation conditions, the following methods are considered.

One is actual measuring by installer, and the other is calculation the angle with the vertical axis and the based on output from a built-in sensor within the range image camera, the sensor detects the posture (direction) of the range image camera.

The sensor detecting a posture includes a acceleration sensor and so on.

In addition, the height from the floor would be calculated by triangulation method based on the range information from the range image camera 1 and the angle with the vertical axis detected from the acceleration sensor.

In this way, information for calculating the relations between a camera coordinate system and a world coordinate system can be obtained.

Figure 2:
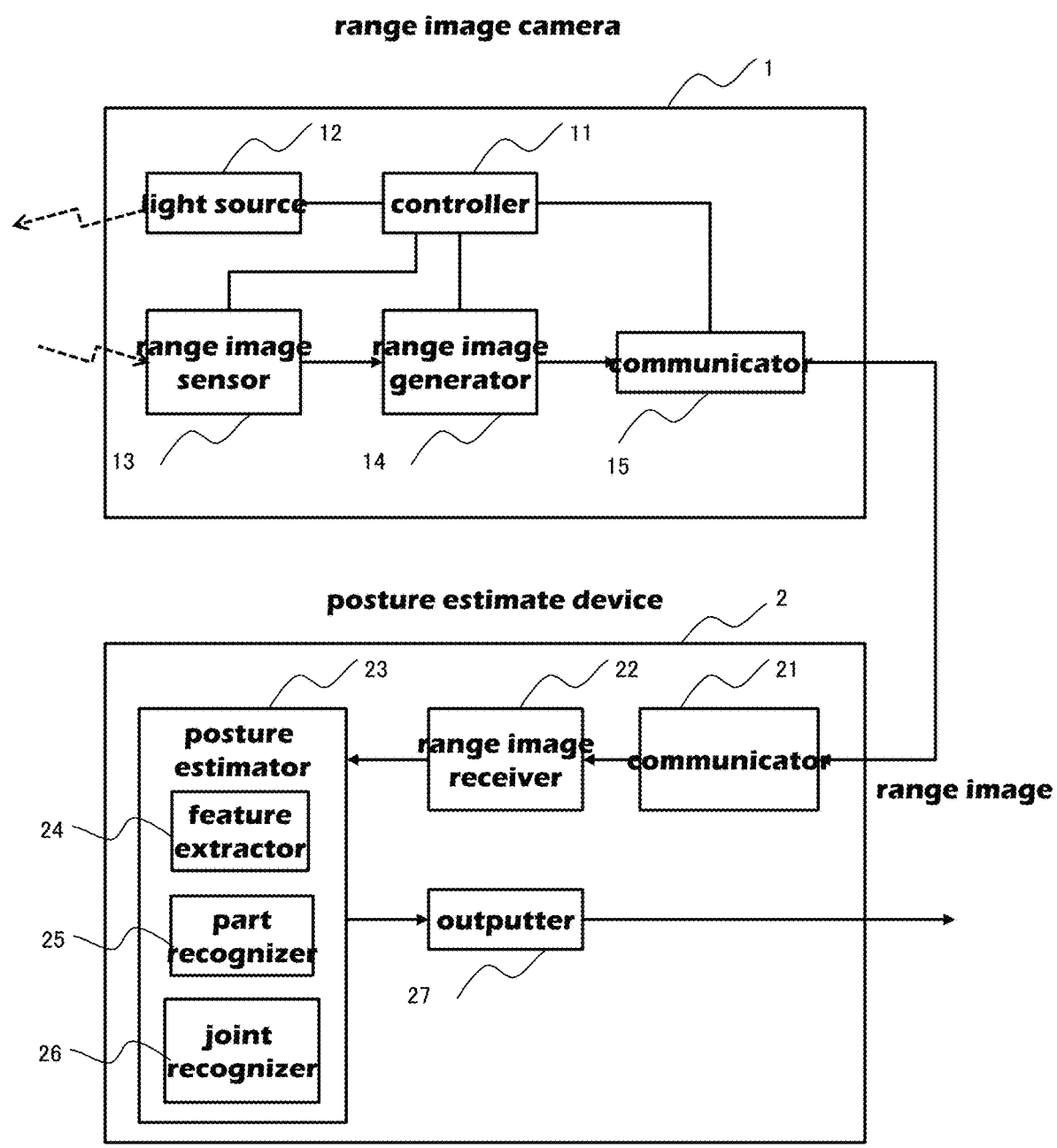
FIG. 2 is a functional block diagram of a conventional range image camera and the posture estimation device.

FIG. 2 is a functional block diagram of a conventional example of a range image camera and a posture estimation device, which are the premise of this embodiment.

A range camera 1 includes a controller 11, a light source 12, a range image sensor 13, a range image generator 14 and a communicator 15.

A posture estimation device 2 includes a communicator 21, a range image receiver 22, a posture estimator 23 and an outputter 27.

The posture estimator 23 includes a feature extractor 24, a parts recognizer 25 and a joints recognizer 26.

The controller 11 controls the light source 12, the range image sensor 13, the range image generator 14 and the communicator 15.

For example, the controller 11 sends commands to the light source 12 to illuminate light, sends commands to the range image sensor 13 to generate phase difference information between illumination light and reflection light, sends commands to the range image generator 14 to generate range image, and sends commands to the communicator 15 to send the generated range image.

The controller 11, for example, is implemented by microcomputer including a CPU (Central Processing Unit), a RAM (Random Access Memory) and so on or an exclusive hardware circuit.

The light source 12 illuminates light toward an object space where there are objects such as persons.

The light source 12, for example, can be implemented by devices such as a light emitting diode which illuminates infrared light or visible light, or a semiconductor diode.

The range image sensor 13 receives the reflection light from the object space via an imaging lens (no figure), generates phrase difference information and gray scale information of each pixel when the light is illuminated and the light is received, and outputs the generated information.

The range image sensor 13 is, for example, configured by arranging plural light receiving elements which generate phrase difference information and gray scale information when the light is illuminated and the light is received into two dimensional form.

The range image generator 14 calculates range information of each pixels based on the phase difference information of each pixels output from the range image sensor 13.

Then the range image generator 14 generates input range image of each pixels including range information and gray scale information.

In addition the range image generator 14 extracts foreground pixels from the input range image, removes background from the input images, generates outputting range image including the extracted foreground pixels and the removed background, and sends the generated outputting range image to the posture estimation device 2 through the communicator 15.

For example, the range image generator 14 extracts pixels which have difference as foreground pixels by taking range differences of each corresponding pixels between a range image of an object space and an input range image, the range image of a object space is taken when there is no objects and includes only background.

The extracting method of the foreground pixels is not limited to the described method in this embodiment.

For example, pixels whose range is under the predetermined value can be extracted as foreground pixels.

For example, the range image generator 14 removes background without changing size of input range image (hereinafter, "size" indicates the number of pixels in the vertical and horizontal directions) by setting gray scale information and range information of background pixels to predetermined values (e.g., "1").

In addition, the range image generator 14 can reduce data amount by processing predetermined compression for the outputting range image.

In the above mentioned example, compression ratio in areas where background pixels are continuous can be higher because the background pixels are set to same value.

The range image generator 14, for example, is implemented by microcomputer including a CPU, a RAM and so on or an exclusive hardware circuit.

The communicator 15 is connected to the network N and sends range image output by the range image generator 14 to the posture estimation device 2.

The communicator 15, for example, is implemented by standard network interface such as LAN.

The communicator 21 is connected to the network N and receives range image sent from each range image camera 1.

The range image receiver 22 receives the range image via the communicator 21 and outputs them to the posture estimator 23.

In addition, the range image receiver 22 can process predetermined decompression to the received range image if they were compressed.

The posture estimator 23 estimates the posture of objects like persons included in the range image based on the range image output from the range image receiver 22.

The posture estimator 23 includes the feature extractor 24, the parts recognizer 25 and the joint recognizer 26 for posture estimation processing.

The feature extractor 24 acquires range information of each pixels which configure a range image.

In addition, the feature extractor 24 calculates feature of each "featured pixels" which configure foreground pixels.

According to the above, the foreground pixels are distinguished from the background pixels because the background pixels are set to predetermined value.

The feature can be calculated by any conventional methods and the calculation methods are not limited to the methods described in this embodiment.

For example, the feature can be defined as the range difference between feature pixels and surrounding pixels around the feature pixels.

For a specific example, 80 dimensional feature vectors (two-dimensional arrangement), which are range differences between a featured pixel and each 80 surrounding pixels, are used for the feature calculation. The 80 surround pixels locate within a rectangular area of 81 pixels which is formed by 9 pixels in the vertical direction multiplicate 9 pixels in the horizontal direction with the featured pixel as the center.

The parts recognizer 25 recognizes parts including each featured pixels, and for example, the "parts" don't include parts of a body like head, arms, hands and the trunk, and joints. The recognition method of the foreground pixels is not limited to the method described in this embodiment.

For example, a part label of the featured pixel is acquired by inputting a feature of a featured pixel to a decision tree (classifier) in which feature threshold and the part label are associated. The part label is an identifier of parts such as the information indicating the kind of each part. A plural decision trees such as random forest can be used as the classifier, and those learned in advance can be stored in a storage device implemented in the posture estimation device 2.

The joints recognizer 26 recognizes joint positions of objects based on the recognized part label of each featured pixel.

The positions of joints can be recognized by any conventional methods and the joints recognition method is not limited to the method described in this embodiment.

For example, a center of gravity position (a joint position candidate) may be acquired obtained for each part which is a group of featured pixels to which same part label is given.

For acquiring the center of gravity position, for example, a mean-shift method can be used. Further, for example, by using a skeletal joint model that defines relationships between joints such as a straight line distance and an angle, the consistency of each center of gravity position with respect to the joint model may be evaluated and joint position may be determined finally.

Also, the joint labels of each joint position may be determined.

A joint label is an identifier of a joint such as information indicating the type of a joint, such as a neck joint, a wrist joint, a shoulder joint, or the like.

The outputter 27 outputs the estimated posture information including the joint position recognized by joint identification department 26.

For example, the joint position is position coordinate information of the coordinate system same as range image.

The estimated posture information may include the range information of each joint position, the joint label of each joint position, line segment information to bind joints together.

For example, outputter 27 may send estimated posture information to an outside computer or a storage device through communicator 21 and may let a display included by posture estimation device 2 to display the image information indicating each joint position.

The outputter 27 may output range image.

Figure 3:
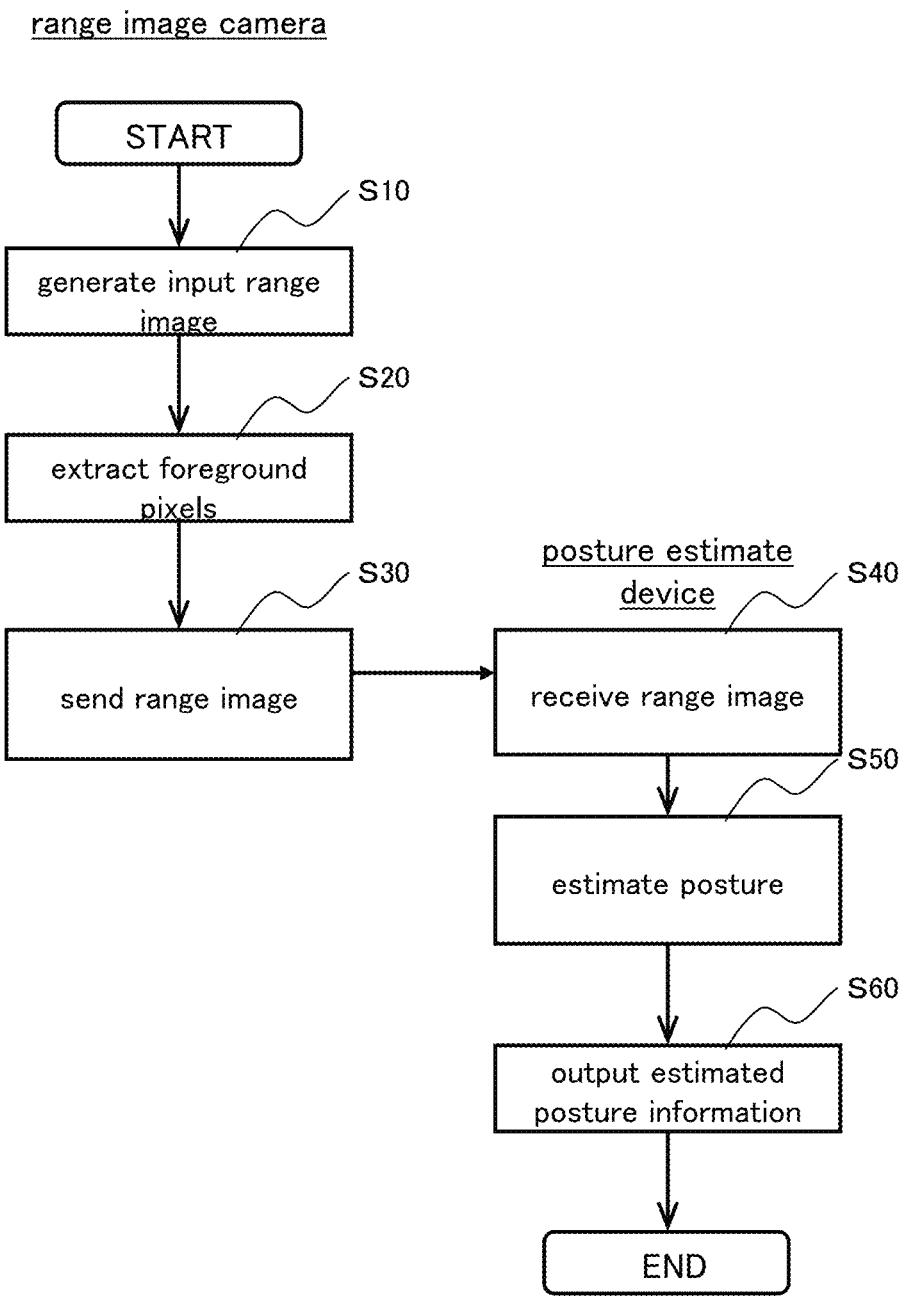
FIG. 3 is a flow chart showing the processing example of the conventional posture estimation system.

FIG. 3 is a flowchart showing the processing example of the conventional posture estimation system.

This flowchart in FIG. 3 is carried out every range image of 1 frame.

At first, in FIG. 3, the range image generator 14 of the range image camera 1 in FIG. 2 generates input range image including range information and gray scale information for each pixel based on information of each pixel output from range image sensor 13 (step S10).

Then the range image generator 14 extracts a foreground pixels from the input range image generated in step S10, removes a background, and generates outputting range image including the extracted foreground pixels and the removed background (step S20).

The range image generator 14 sends outputting range image generated in step S20 to the posture estimation device 2 through the communicator 15 (step S30).

Then, the range image receiver 22 of the posture estimation device 2 receives the range image sent in step S30 by the range image camera 1 through communicator 21 (step S40).

Then, the posture estimator 23 estimates the postures of objects such as persons included in the range image based on the range image received in step S40 (step S50).

Finally, the outputter 27 outputs estimated posture information including the joint position output in step S50 by the posture estimator 23 (step S60).

In this way, conventionally, communication load becomes heaver because the range image generator 14 sends generated range image to the posture estimation device 2 in step S30.

In addition, there is a problem that processing load became heaver because posture of objects is estimated based range image in step S50.

Therefore, in this embodiment, a range image camera which can reduce communication load and processing load, and a posture estimation device are described as follows.

Figure 4:
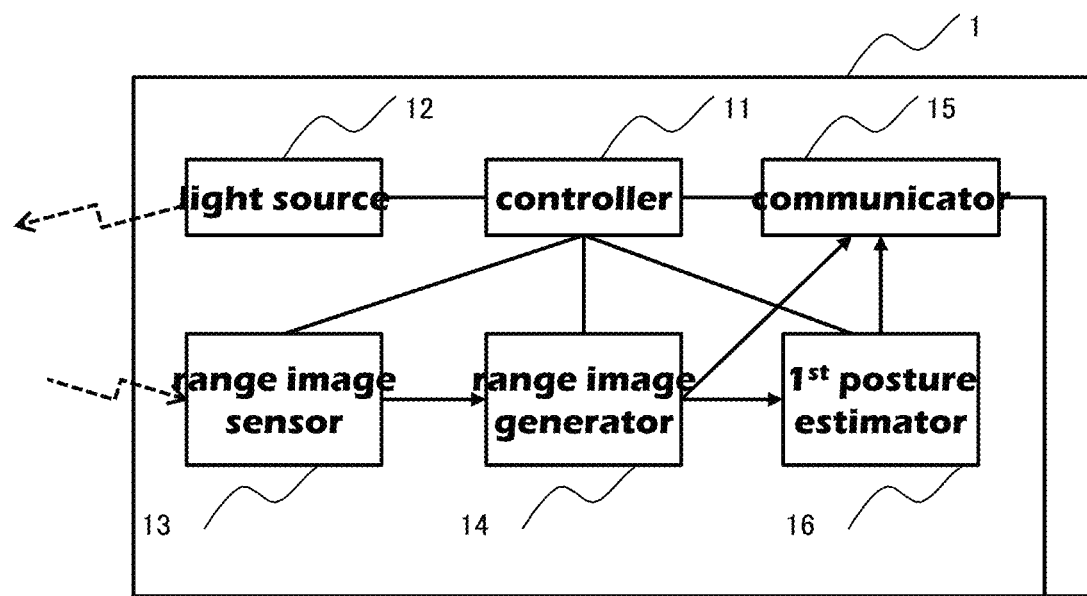
FIG. 4 is a functional block diagram showing an example of a range image camera and the posture estimation device.
Figure 4:
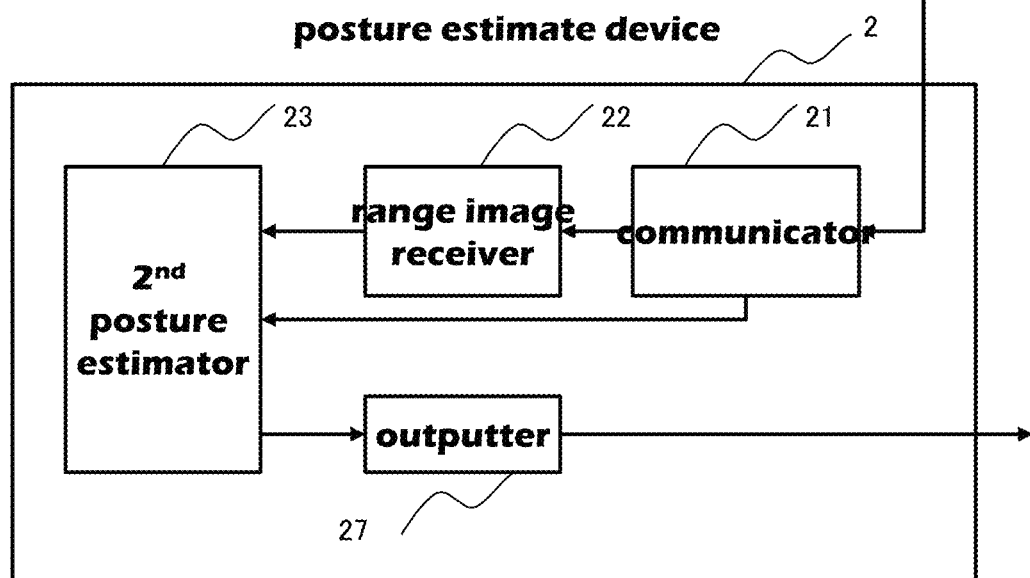

FIG. 4 is a functional block diagram showing an example of a range image camera and the posture estimation device. In FIG. 4, a range image camera 1 includes a controller 11, a light source 12, a range image sensor 13, a range image generator 14, a communicator 15 and a 1st posture estimator 16. Then, a posture estimation device 2 includes a communicator 21, a range image receiver 22, a 2nd posture estimator 23, and an outputter 27. The detailed description will be given later.

Figure 5:
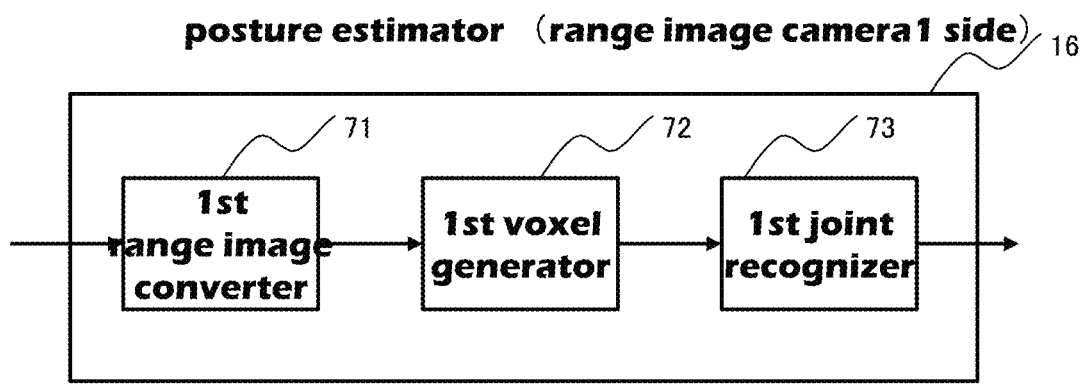
FIG. 5 is a diagram showing an example of the posture estimator of the range image camera.

FIG. 5 is a functional block diagram showing an example of the 1st posture estimator 16 of the range image camera 1. The 1st posture estimator 16 includes a 1st range image converter 71, a 1st voxel generator 72, and a 1st join recognizer 73. The detailed description will be given later.

Figure 6:
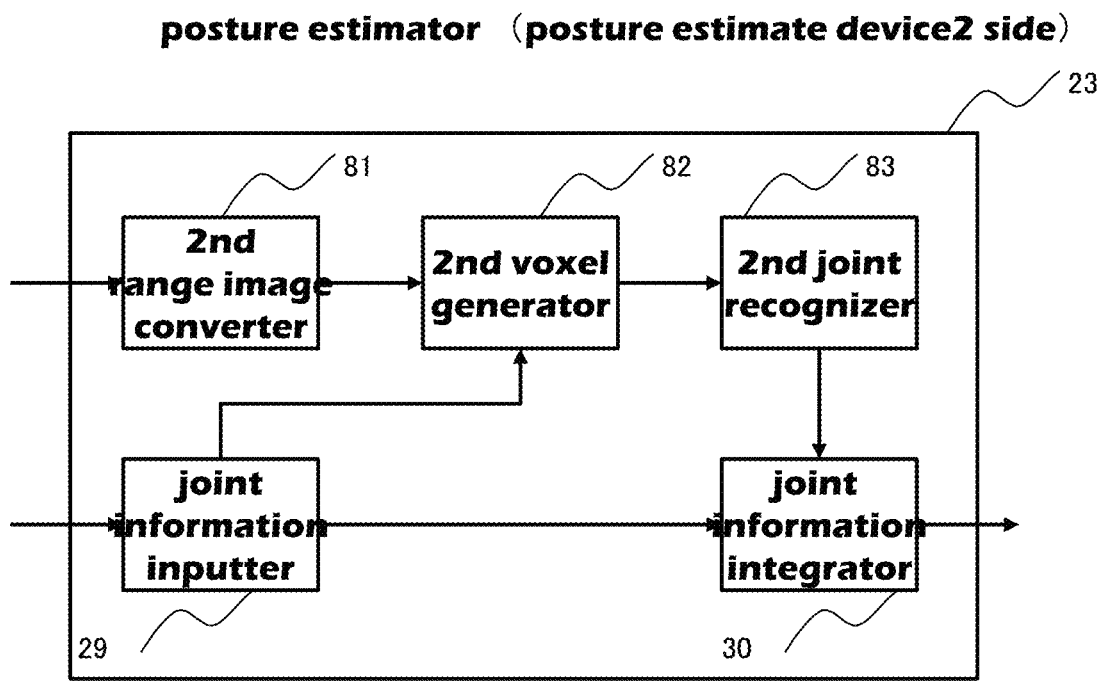
FIG. 6 is a diagram showing an example of the posture estimator of the posture estimation device.

FIG. 6 is a functional block diagram showing an example of the 2nd posture estimator 23 of the posture estimation device 2. The 2nd posture estimator 23 includes a 2nd range image converter 81, a 2nd voxel generator 82, a 2nd join recognizer 83, a joint information inputter 29 and a joint information integrator 30. The detailed description will be given later.

Figure 7:
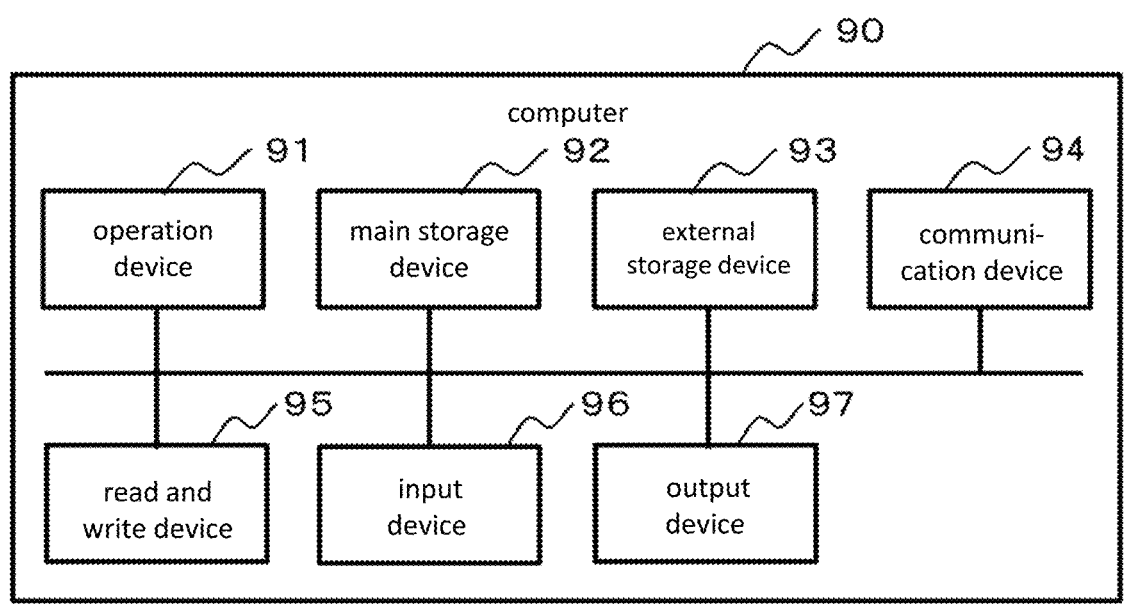
FIG. 7 is a diagram showing an example of hardware of computer for implementing the posture estimation device.

FIG. 7 is a diagram showing an example of hardware of computer for implementing the posture estimation device. The posture estimation device 2 can be realized by a computer 90 as shown in FIG. 7. The computer 90 is, for example, a server computer, and may be a computer device such as a personal computer, a smartphone, a tablet computer, or the like. Further, the posture estimation device 2 may be configured by a plurality of computers 90.

In FIG. 7, the computer 90 includes operation device 91, main storage device 92, external storage device 92, communication device 93, read and write device 95, input device 96 and output device 97.

The operation unit 91 is, for example, an operation unit such as a CPU. The main storage device 92 is, for example, a storage device such as a RAM. The external storage device 93 is, for example, a storage device such as a hard disk, a SSD (Solid State Drive) or a flash ROM (Read Only Memory). The communication device 94 is a device that transmits and receives information, and includes a communication device that performs wired communication via a network cable and a communication device that performs wireless communication via an antenna. The read and write 95 is a device that reads and writes information in a recording medium such as a DVD (Digital Versatile Disk) or a USB (Universal Serial Bus) memory. The input device 96 is a device that accepts input information and includes a pointing device such as a keyboard and a mouse, a touch panel or a microphone. The output device 97 is a device that outputs output information and includes a display, a printer or a speaker. At least a part of the main storage device 92 and the external storage device 93 may be implemented by storage devices on network connected via the communication device 94, for example.

The range image receiver 22, the posture estimator 23 and the outputter 27 (these may be referred to as "a controller") are, for example, implemented by the operation device 91 executing predetermined application programs. The application programs are, for example, stored in the external storage device 93, loaded on the main storage device 92 for execution, and executed by the arithmetic device 91. The communicator 21 is, for example, implemented by the communication device 94.

Figure 8:
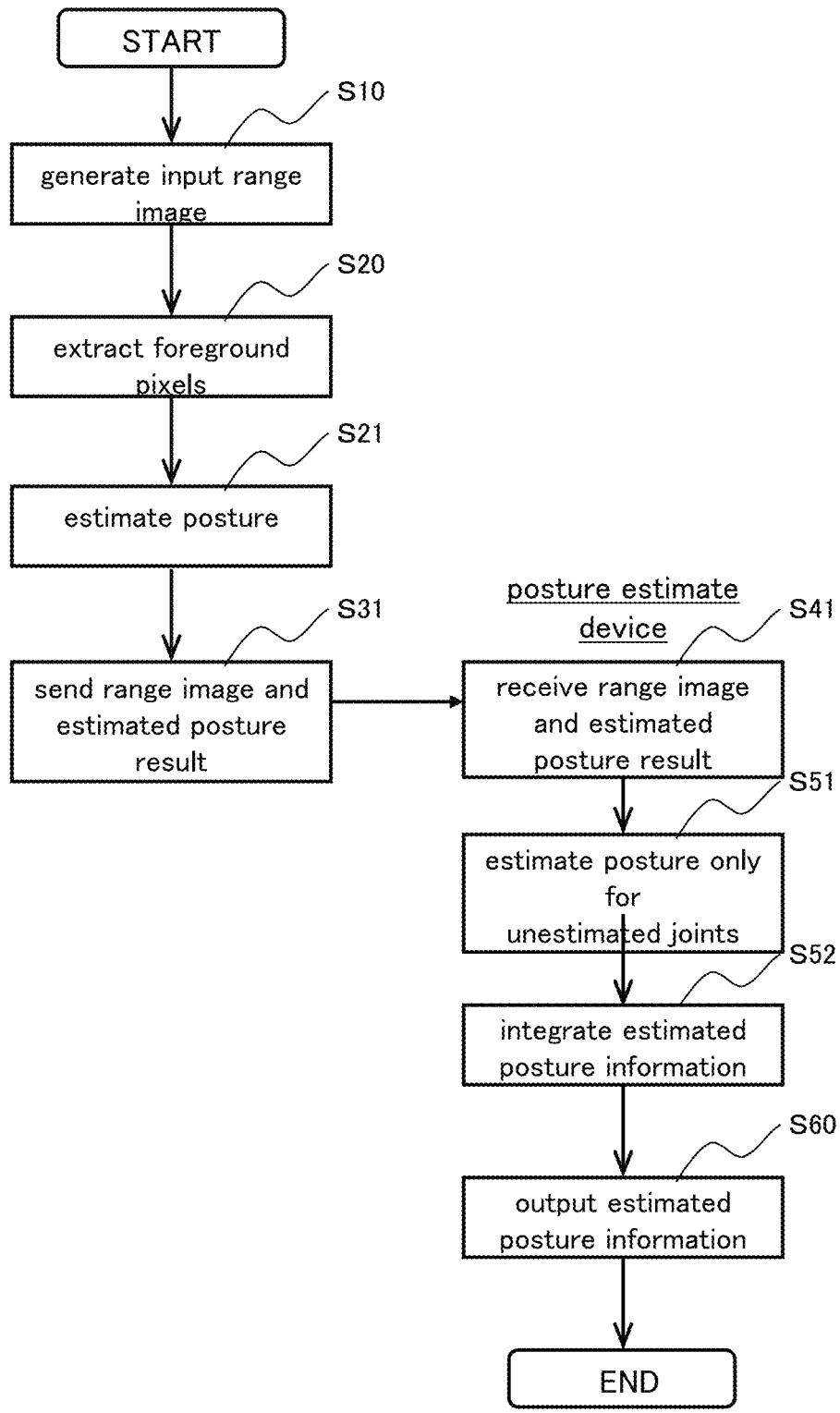
FIG. 8 is a flowchart showing an example of a processing of the posture estimation system.

FIG. 8 is a flowchart showing an example of a processing of the posture estimation system in this embodiment. In FIG. 8, steps same as those of FIG. 3 are denoted by the same reference numerals, and description thereof is omitted. In FIG. 8, the differences from FIG. 3 are that the processing includes steps S 21 and S 31 in the procedure of the range image camera, and includes steps S 41, S 51 and S 52 in the procedure of the posture estimation device.

In FIG. 8, the first posture estimator 16 in the range image camera 1 estimates a part of posture of the objects such as persons included in the outputting range image based on the outputting range image generated in step S20 (step S21). The detailed description will be given later.

Then, the first communicator 15 sends result of posture estimation estimated in step 21 and range image which is excluded the range image of the portion estimated in step S21 from the output range image generated by the range image generator 14 to the posture estimation device 2 (step S31). The detailed description will be given later.

Then, the range image receiver 22 receives the range image sent from the range image camera 1 in step S31 via second communicator 21, and second posture estimator 23 receives the first result of posture estimation sent from the range image camera 1 in step S31 via second communicator 21 (step S41).

The second posture estimator 23 estimates posture of the objects such as persons included in the range image based on the range image received in the step S41 (step S51).

Then, the second posture estimator 23 integrates posture of the objects such as persons included in the range image based on second result of the posture estimation estimated in step S51 and the first result of the posture estimation received in step S41 (step S52).

Finally, the outputter 27 outputs posture estimation information output from the second posture estimator 23 in step S52 (step S60).

Figure 9:
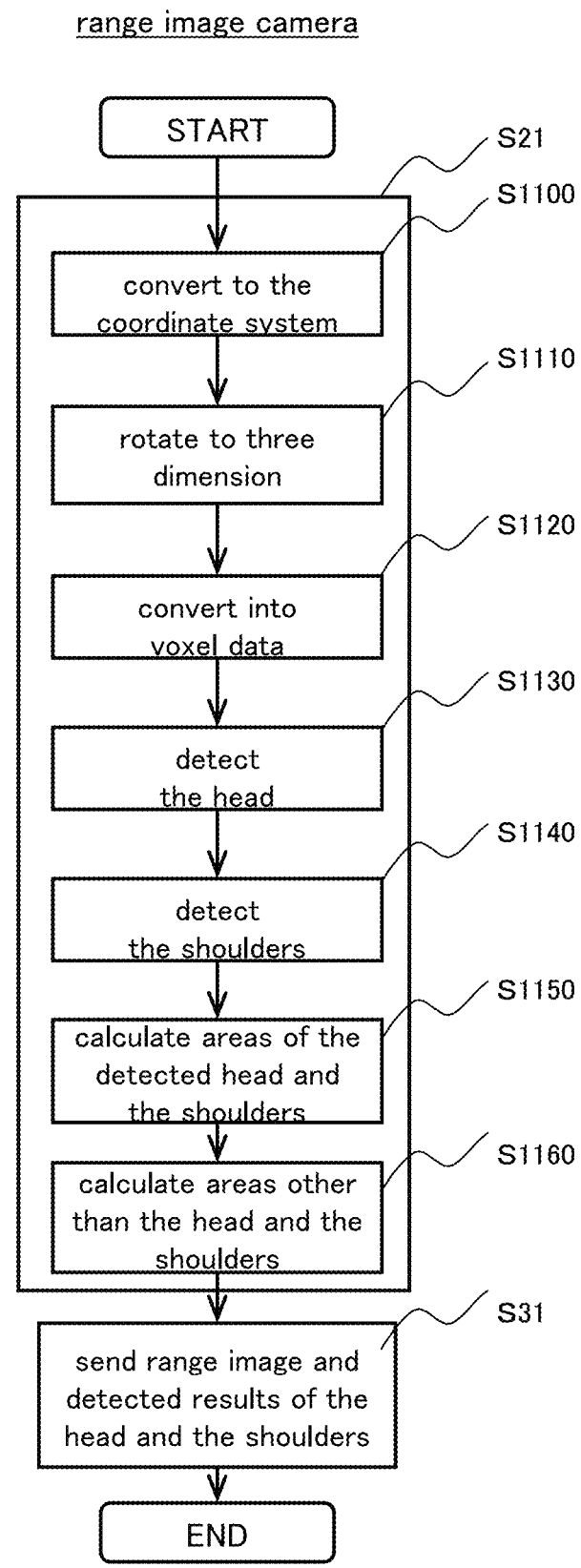
FIG. 9 is a flowchart showing an example of a processing of the posture estimation of the range image camera.

FIG. 9 is a flowchart showing the details about steps S21 and S31 in FIG. 8.

In FIG. 9, the 1st range image converter 71 in FIG. 5 converts the foreground pixels extracted in step S20 from two dimensional rθφ coordinate system to three dimensional XYZ coordinate system (step S1100).

Then, the 1st range image converter 71 converts the camera coordinate system to the world coordinate system by rotating the foreground pixels to the X axis, the Y axis, and the Z axis respectively, the foreground pixels have been converted to XYS coordinate system in step S1100. The camera coordinate system and the rotation angle of the world coordinate system can be calculated beforehand from the installation conditions of the X axis, the Y axis and the Z axis when the distance image camera is installed.

Then, the 1st voxel generator 72 in FIG. 5 converts the foreground pixels in the XYZ coordinate system converted in step S 1100 into voxel data (step S 1120

A voxel is a an element of volume and represents a value of a regular lattice unit in three-dimensional space. Three-dimensional space can be expressed discretely by three-dimensionally sequentially arranging and filling voxels in the X axis, the Y axis, and the Z axis direction in the XYZ space. For example, when the size of the voxel is (x, y, z)=(10, 10, 10), the voxel belonging to which the pixel existing at an origin (0, 0, 0) can be expressed as the voxel of its center coordinates (0, 0, 0). The voxel belonging to which the pixel existing at the coordinates (12, 12, 12) can be expressed as the voxel of its center coordinates (10, 10, 10). As another expression, the pixels belonging to the voxel whose center coordinates are (X, Y, Z) are the x, y, z coordinates of X−5 to X+5, Y−5 to Y+5, Z−5 To (Z+5) the pixels.

Figure 10:
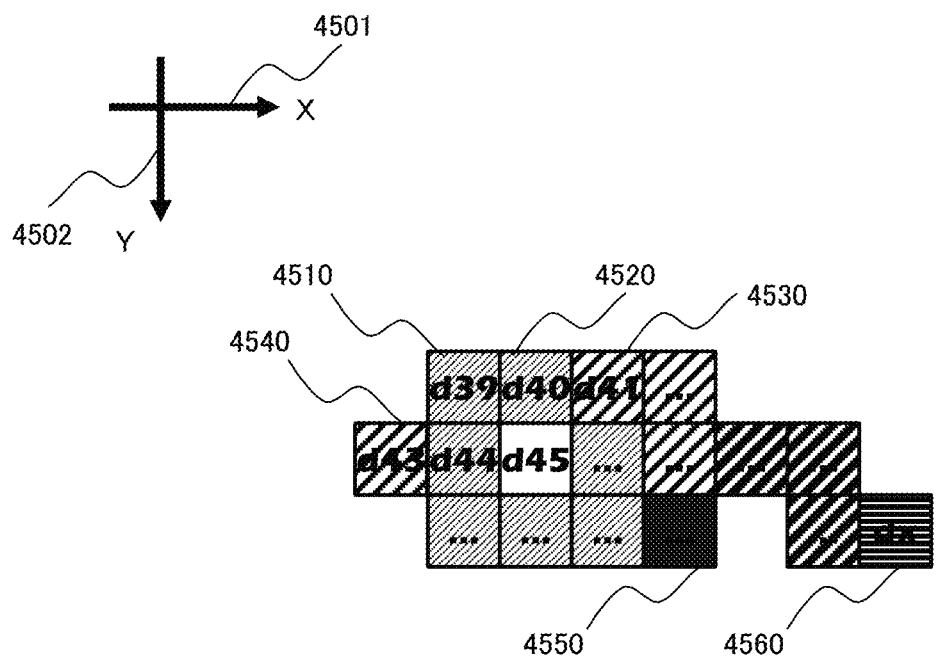
FIG. 10 is an example of a diagram showing voxels projected on two-dimensional coordinates.

FIG. 10 is an example of a diagram showing voxels in two-dimensional coordinates. This figure is a diagram of the voxels existing in the XYZ space projected on the XY plane in the Z axis direction. The right direction in the Figure is the X axis direction, and the downward direction is the Y axis direction. 4501 is the X axis. 4502 is the Y axis. 4510 to 4560 are voxels. For example, the voxel 4510 has a Z coordinate of d 39.

Figure 11:
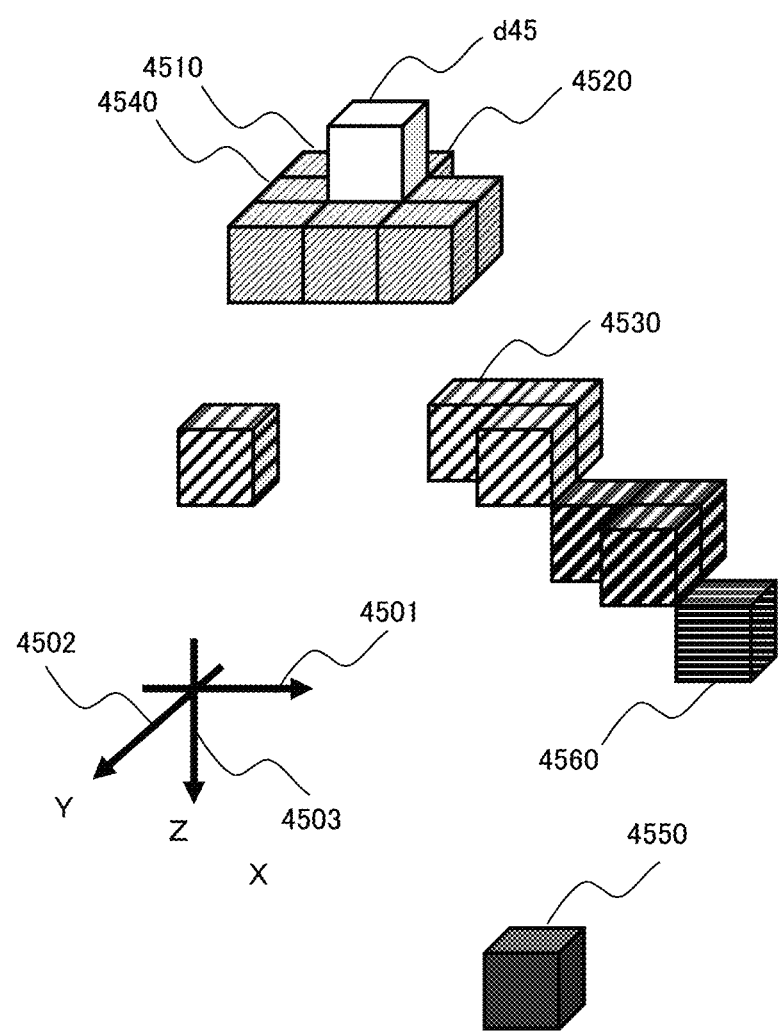
FIG. 11 is an example of a bird's-eye view showing voxels in three-dimensional coordinates.

FIG. 11 is an example of a bird's-eye view showing voxels corresponding to FIG. 10 in XYZ coordinates. 4501 is the X axis. 4502 is the Y axis. 4503 is the Z axis. 4510 to 4560 are voxels.

In this way, the coordinates of the voxel are set as the center coordinates in the XYZ space, and the size of the voxel is set to a predetermined size (x, y, z). In the case where the number of pixels included in the voxel is the number of elements "d" of the voxel, a list of all (x, y, z, d) of the voxels including the foreground pixels as a whole is defined as voxel data.

FIG. 12 shows an example of a data structure of voxel data. Column 4810 indicates the X coordinate of the center of the voxel. Column 4820 indicates the Y coordinate of the center of the voxel. Column 4830 indicates the Z coordinate of the center of the voxel. A column 4840 indicates the total number of pixels belonging to the voxel. Row 4850 is data obtained by collecting the XYZ coordinates of a first voxel and the number of pixels belonging to the first voxel. Row 4860 is data obtained by collecting the XYZ coordinates of a second voxel and the number of pixels belonging to the second voxel. The values from row 4870 to row 4880 are data obtained by collecting the XYZ coordinates of each voxel and the number of pixels belonging to the each voxel, in the same way as above.

Returning to FIG. 9, in step S 1130, the 1st joint recognizer 73 in FIG. 5 searches the voxel data converted in step S 1120 to identify joints of head.

For searching the head, for example, when the Z axis of the world coordinates is vertically downward, the voxel data can be sorted in ascending order by the z value, and head voxel can be detected as the head. D45 in FIGS. 10 and 11 corresponds to this. This is an effective method, for example, when the target of estimating the posture is upright.

Next, in step S 1140, the 1st joint recognizer 73 recognizes joints of shoulder based on the coordinates of the head detected in step S 1130.

In the search of the shoulder, if the coordinates of the head are (X1, Y1, Z1), voxels intersecting the circle with the radius s centered on the coordinate (X1, Y1, Z1+h) can be extracted and can be candidates for the left and right shoulders. Here, "h" is the height from the shoulder to the head, and s×2 is the width of the shoulder. 4510 and 4540 in FIGS. 10 and 11 correspond to this.

In the case that there are a plurality of voxels of the extracted candidates for left and right shoulders, two voxels are determined as the left and right shoulders respectively, the two voxels are a combination in which inner product of the vectors from the center coordinates (X1, Y1, Z1+h) of the circle to the center coordinates of the voxels of each candidates for shoulders are the smallest. If there is only one voxel of the extracted left and right shoulder candidates, it can be determined to be either the left or right shoulder.

Based on recognized coordinates of the head and the shoulders, the foreground pixels constituting the head and the foreground pixels constituting the shoulders are extracted (step S 1150). For example, foreground pixels constituting the head can be regarded as foreground pixels existing inside a sphere having a radius "h" centered on the coordinates of the head recognized in step S 1130.

Also, the foreground pixels constituting the shoulders can be regarded as foreground pixels having a Z coordinate smaller than the Z coordinate of the shoulders recognized in step S 1140.

Finally, the 1st joints recognizer 73 calculates remaining foreground pixels other than the head and the shoulder (step S 1160), by excluding the foreground pixels calculated in step S 1150 from the entire foreground pixels, for example, filling the foreground pixel calculated in step S 1150 with a predetermined value.

Then, the 1st joints recognizer 73 outputs the range image data of the remaining foreground pixels other than the head portion and the shoulder portion calculated in step S 1160, and the coordinates of the head and shoulders recognized in step S 1130 and step S 1140, to the posture estimator via the communicator 15 (step S 31).

Figure 13:
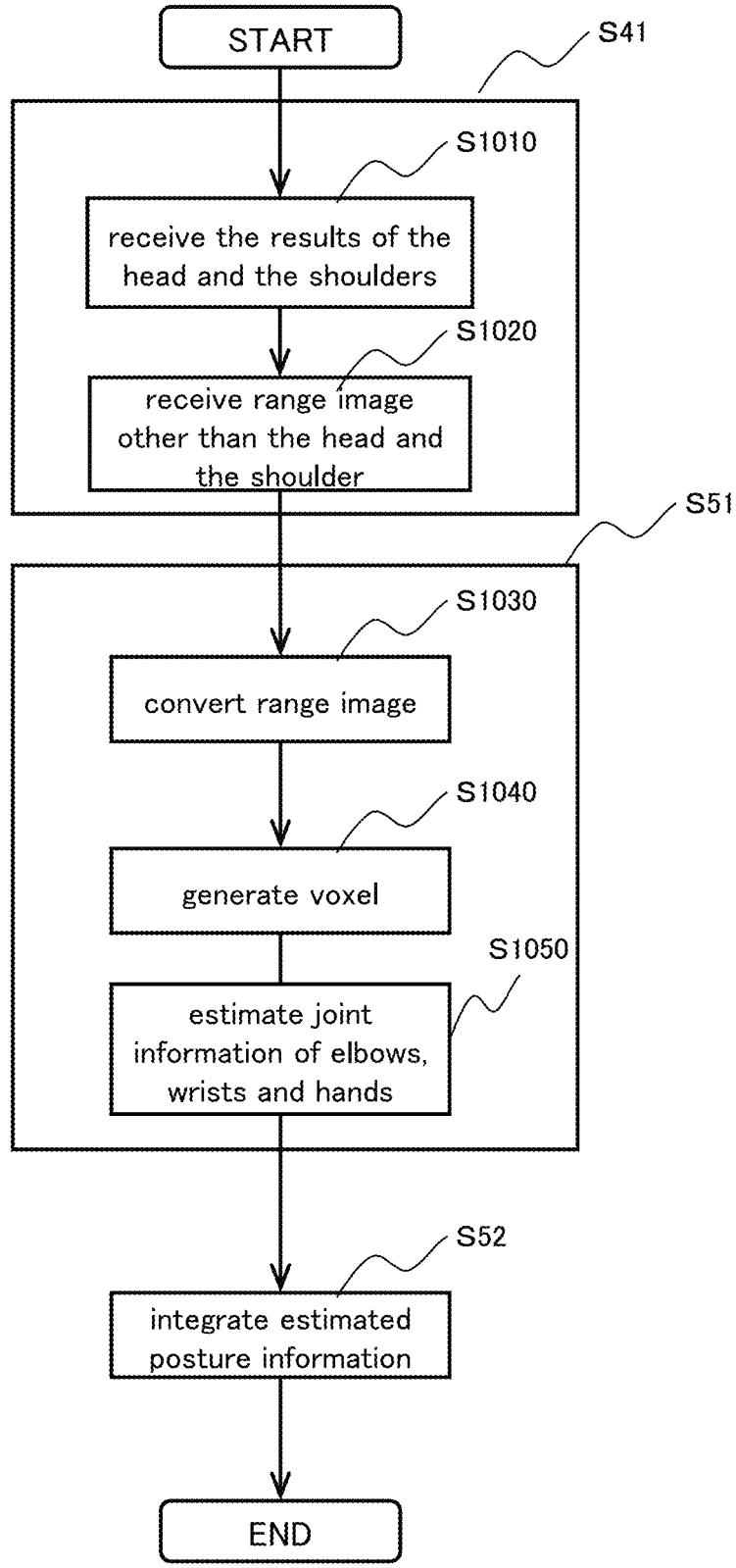
FIG. 13 is an example of a flowchart showing a processing of the posture estimation of the posture estimation device.

FIG. 13 is a detailed processing flowchart of steps S41, S51 and S52 in FIG. 8.

In FIG. 13, the joint inputter 29 of FIG. 6 receives the coordinates of the head and the shoulder input from the range image camera 1 via the communicator 21 (step S 1010).

The range image receiver 22 in FIG. 4 receives the range image input from the range image camera 1 via the communicator 21, and outputs it to the posture estimator 23 (step S 1020).

Next, in step S1030, the 2nd range image convertor 81 of FIG. 6 converts the coordinate axis of the range image input from the range image receiver 22 in step S1020, and converts the coordinate axis. This is the same processing as step S 1100 and step S 1110 of FIG. 9.

Next, the 2nd voxel generator 82 generates voxel data from the foreground image data converted in step S1030 (step S1040). This is the same processing as step S 1120 in FIG. 9.

Furthermore, the 2nd joint recognizer 83 recognizes coordinates of unestimated joints (coordinates of elbows, wrists and hands) from the voxel data generated in step S 1040 (step S 1050). At this time, information indicating which of the identified joints can be acquired by inputting coordinates of estimated joints (head and shoulders) from the joint input unit 29.

Finally, the joint integrator 30 of FIG. 6 integrates the coordinates of the head, shoulders, elbows, wrists and hands based on the coordinates of the joints identified in step S 1050 and the joint coordinates input to the joint input unit 29 (Step S52).

When integrating the joints, joint coordinates can be simply used as they are. Or, it is also possible to exclude the joint coordinates that can be determined that the estimation is incorrect by checking the positional relationship between the joints as an invalid identification result. By excluding them, it is possible to avoid the risk of outputting erroneous information and deteriorating detection accuracy.

As a method of judging whether the estimation is correct or incorrect using the positional relationship between the joints, it can be judged based on the degree of deviation from the movable range of the joints or the average length of the skeleton.

As described above, in the present embodiment, the range image camera and the posture estimation device share the estimation processing. Then, regarding the range image, only the range image related to the joint estimated by the posture estimation device is sent from the range image camera to the posture estimation device, and the range image for the other joints, the estimation result estimated by the distance image camera is sent to the posture estimation device. Specifically, the range image camera 1 extracts the foreground pixels from the range image, erases the background, estimates the joints of the head and shoulders, further erases the pixels corresponding to the head and shoulders from the foreground pixels, and sends the range image together with the estimation result of the joints of head and shoulders to the posture estimation device 2. Thereby, it is possible to reduce the communication load of the network N and the processing load of the posture estimation device 2.

Embodiment 2

In this embodiment, posture estimation processing different from that of the first embodiment is described. The overall functional configuration of the range image camera and the attitude estimation device in this embodiment is the same as FIG. 4. In this embodiment, the posture estimator 16 of the range image camera and the posture estimator 23 of the posture estimation device are different from those of FIG. 5 and FIG. 6 in the embodiment 1. In this embodiment, the same reference numerals are given to the same functions in the embodiment 1, and the different points will be mainly described.

Figure 14:
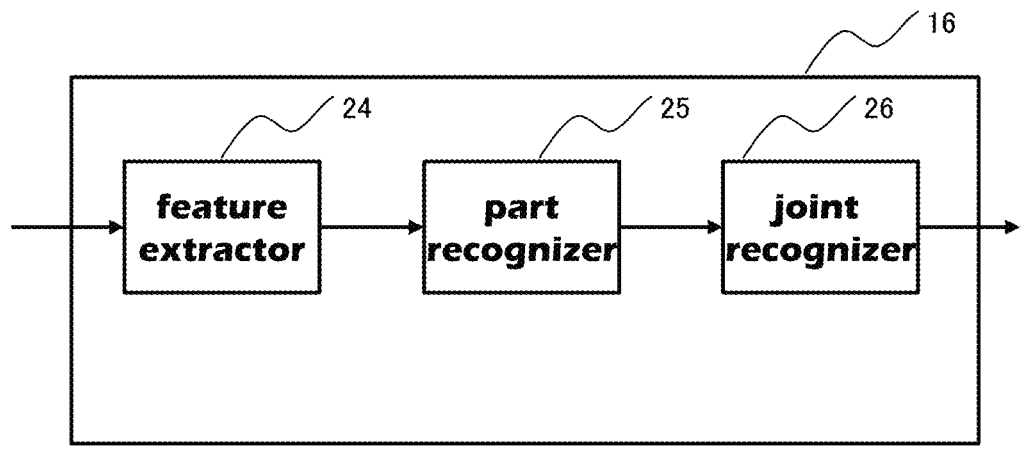
FIG. 14 is an example of a functional configuration diagram of the posture estimator 16 of the range image camera.

FIG. 14 is a functional configuration diagram of the posture estimator 16 of the range image camera in this embodiment. In FIG. 14, the posture estimator 16 includes a feature extractor 24, a parts recognizer 25, and a joints recognizer 26.

Figure 15:
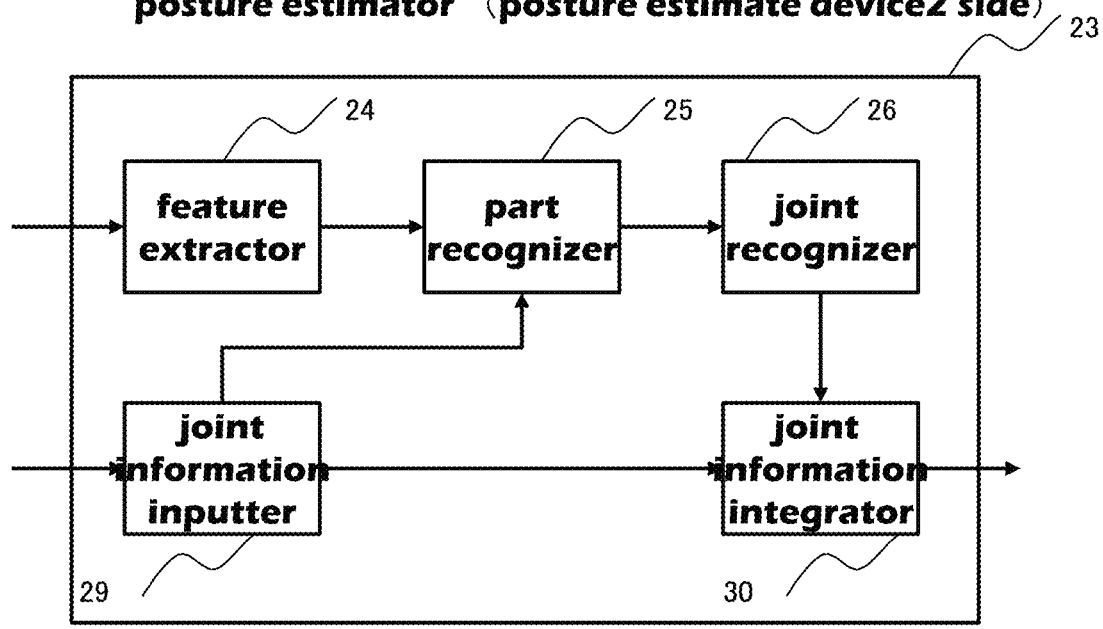
FIG. 15 is an example of a functional configuration diagram of the posture estimator 23 of the posture estimation device.

FIG. 15 is a functional configuration diagram of the posture estimator 23 of the posture estimation device in this embodiment. In FIG. 15, the posture estimator 23 includes the feature extractor 24, the parts recognizer 25, the joints recognizer 26, the joint information inputter 29, and the joint information integrator 30.

Figure 16:
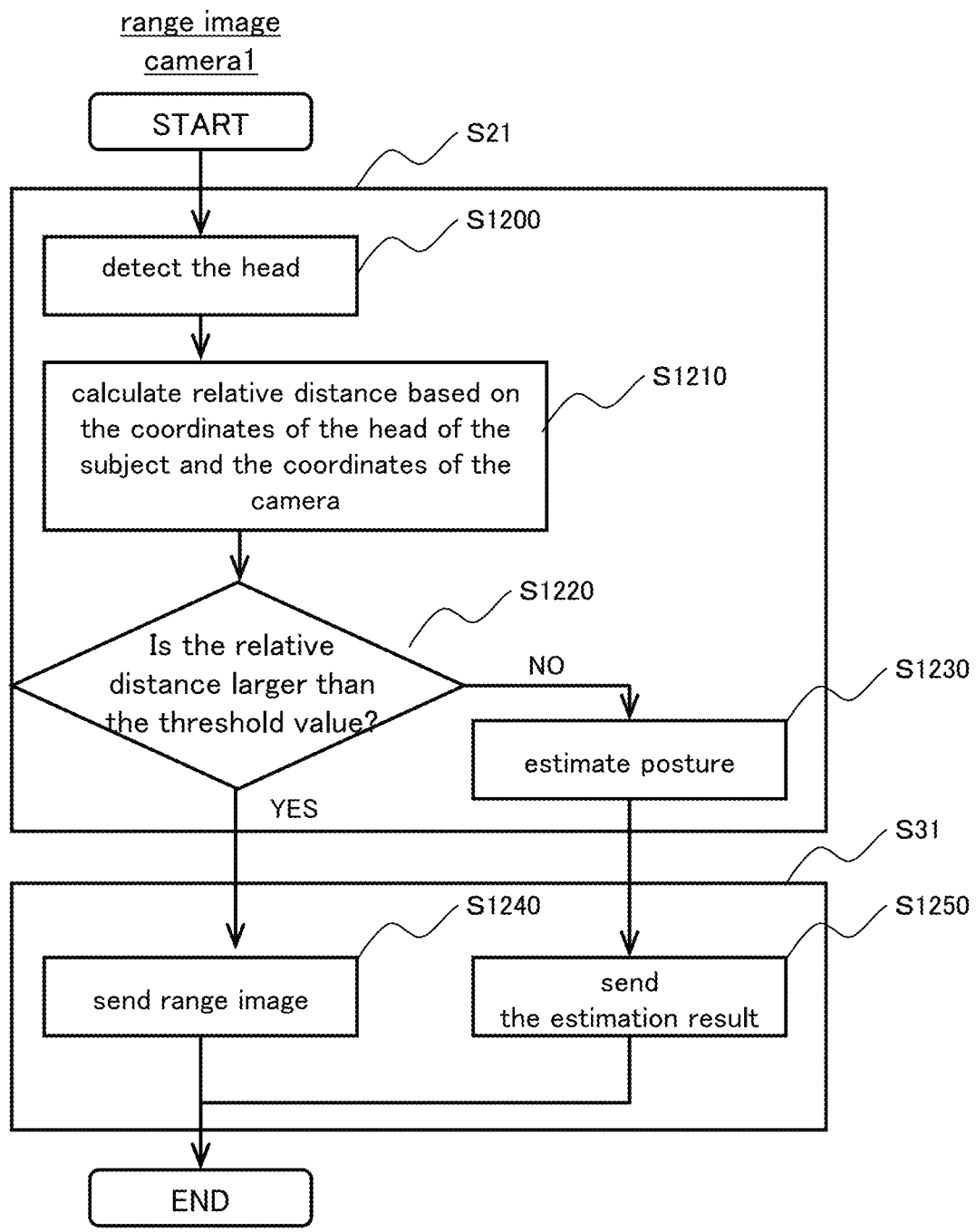
FIG. 16 is an example of a flowchart showing a processing of the range image camera.

Then, FIG. 16 is a flowchart of the attitude estimation processing of the range image camera in this embodiment. The flowchart in FIG. 16 shows details of steps S 21 and S 31 in FIG. 8.

In FIG. 16, firstly, the feature extractor 24 in FIG. 14 detects the pixels closest to the range image camera from the foreground pixels and regards the coordinates of the pixels as the coordinates of the head (step S 1200).

Next, the feature extractor 24 converts the coordinates of the head detected in step S 1200 from the camera coordinate system to the world coordinate system and obtains vectors from the coordinates of the range image camera itself to the coordinates of the head so that the angle formed by the vertical axis and the vectors can be obtained (step S 1210). For example, when the range image camera is directed in the vertical axis direction and the head is detected on the axis, the angle formed is 0 degree. Further, for example, when the range image camera is directed in the horizontal direction and the head is detected on the axis, the angle formed is 90 degrees.

Next, the feature extractor 24 determines whether the angle obtained in step S 1210 is larger than the threshold value or not (step S 1220). If the angle is larger than the threshold value in step S1220, the recognizing processing of the posture estimator 16 is skipped and the range image are sent (step S1240).

If the angle is smaller than the threshold value in step S 1220, posture estimation is performed (step S 1230). Finally, the recognition result of step S 1230 is sent (step S 1250).

Figure 17:
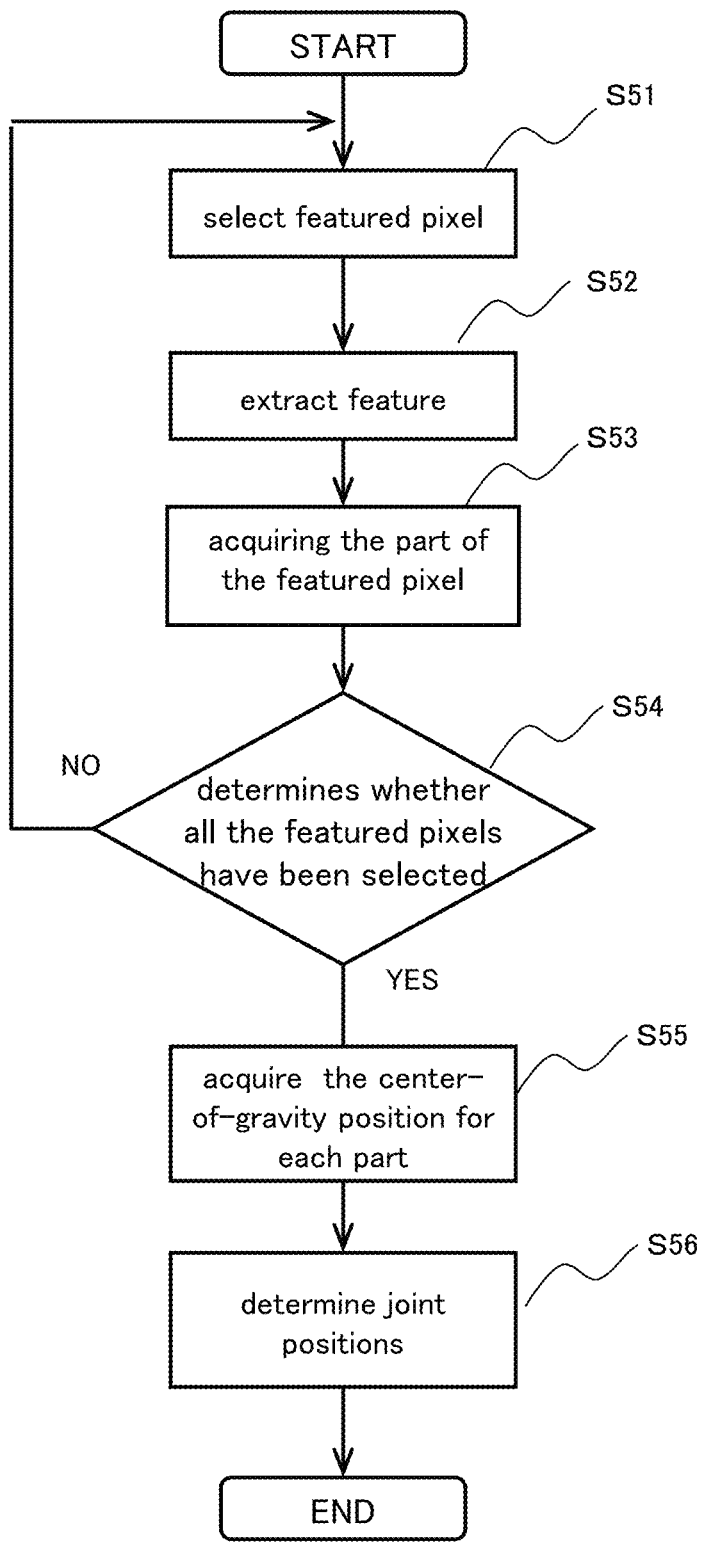
FIG. 17 is an example of a flowchart showing the posture estimation processing of the range image camera.

FIG. 17 is an example of a flowchart showing the posture estimation processing of the range image camera in this embodiment. FIG. 17 shows details of step S 1230 of FIG. 16.

In FIG. 17, firstly, the feature extractor 24 in FIG. 14 selects one featured pixel from the foreground pixels (step S 51), and calculates the feature of the featured pixel based on the range information between the selected featured pixel and one or more surrounding pixels (S52). Then, the parts recognizer 25 inputs the calculated feature of the featured pixel to a prepared recognizer, thereby acquiring the part label of the featured pixel (step S 53).

Then, the posture estimator 23 determines whether all the featured pixels constituting the foreground pixels have been selected (step S 54). When it is determined that all the featured pixels are not selected (NO in step S 54), the posture estimator 23 returns the processing to step S 51. When it is determined that all the featured pixels are selected (YES in step S54), the posture estimator 23 proceeds the processing to step S55.

The joint recognizer 26 in FIG. 14 acquires the center-of-gravity position (a joint position candidate) for each part based on the part labels of the respective featured pixels recognized in step S 53 (step S 55). Finally, the joint recognizer 26 determines the final one or more joint positions based on the acquired center-of-gravity position of each part (step S56).

Figure 18:
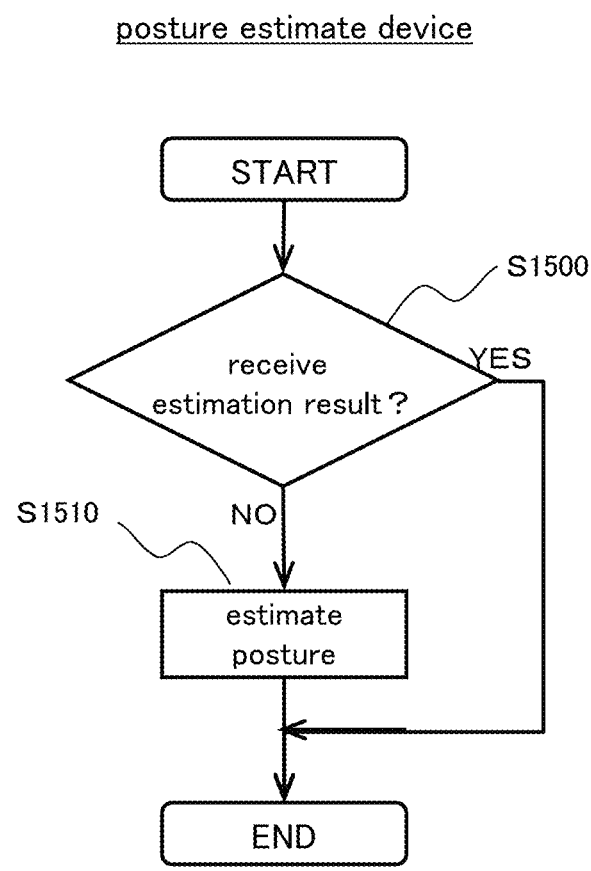
FIG. 18 is an example of a flowchart showing a processing of the posture estimation of the posture estimation device.

FIG. 18 is a flowchart of the posture estimation processing of the posture estimation device according to this embodiment. FIG. 18 shows the details of the processing in place of the steps S 41, S 51, S 52 in FIG. 8.

In FIG. 18, firstly, the posture estimator 23 receives the posture estimation result via the communicator 21 (step S 1500). If the estimation result can be received, the estimation result is output as it is. If the estimation result is not received, the range image data is received from the range image receiver 22, and posture estimation processing is performed based on the received data (step S1510).

The processing of step S1510 is similar to the posture estimation processing described in FIG. 17.

As described above, in the posture estimation system according to this embodiment, when the range image camera 1 is positioned at an angle close to the head of the subject, it is sufficient to estimate only the joints of the upper body, so that the posture estimation processing is performed in the range camera 1. Since only the estimation result is transmitted, the amount of transmission data can be made smaller than the range image data, and communication load and processing load can be reduced.

In addition, when the range image camera 1 is at an angle apart from the head of the subject, it is necessary to estimate the joints of the whole body, so it is difficult for the limited resource in the range camera to perform the posture estimation processing because of a high load. However, it is possible to perform posture estimation with high accuracy by transmitting the range image data and estimating the posture in the posture estimation device. For example, when the range camera is installed at a high place and installed vertically downward, the whole body of the subject can be imaged by the range camera in the vicinity of the outer periphery of the FOV (Field Of View) of the range camera. Besides, in the vicinity of the center of the FOV, only the upper body of the subject can be imaged as seen from the range camera, and only the upper body joint is estimated.

Therefore, when the subject walks across the FOV of the range camera, the estimation is processinged in order of whole body⇒upper body⇒whole body, and the processing load changes like high⇒low⇒high.

In the state of "high" processing load, that is, the case where the subject exists near the outer periphery of the FOV, become a factor for the network load connecting from the range image camera to the posture estimating device and the processing load of the posture estimating device. However, in this embodiment, in a situation where a plurality of subjects go and go randomly, the processing load of the estimation processing is averaged, and the load is dispersed.

Then, as shown in FIG. 1, in a pose estimation system configured such that a plurality of range image cameras are connected and sharing a wide area, the phase of the estimation processing is different for each camera, so that a plurality of subjects are random, the processing load of the estimation processing is averaged and the load is dispersed.

Embodiment 3

In this embodiment, a point of determination whether or not to perform posture estimation processing in the range image camera under different conditions from the second embodiment will be described. Hereinafter, differences from the second embodiment will be mainly described.

The posture estimation processing of the range image camera in this embodiment has the following steps S1310 and S1320 instead of steps S1210 and S1220 in the second embodiment, and the other points are the same. Therefore, the flowchart in this embodiment is omitted, and steps S 1210 and S 1220 in FIG. 16 are replaced with the following steps S 1310 and S 1320, and S 1310 and S 1320 will be described.

In step S1310, after detecting the head in step S1200, the relative distance is calculated based on the coordinates of the head of the subject and the coordinates of the camera.

Then, in step S1320, when the relative distance calculated in step S1310 is larger than the threshold value, the range image is transmitted, and in the case where the calculated relative distance is smaller than the threshold value, it is determined that the posture estimation is performed.

As described above, in the posture estimation system according to this embodiment, when the subject is located at a distance that can be difficult to estimate, the range image data is transmitted to the posture estimation device, estimation processing is performed with high accuracy by the posture estimation device. When the subject is located at a distance that can be easily estimated, there is the effect that the load of the network and the posture estimation device can be dispersed by carrying out estimation processing in the range image camera.

Embodiment 4

In this embodiment, furthermore, a point of judging whether or not to perform posture estimation processing in the distance image camera under different conditions from the second embodiment will be described. Hereinafter, differences from the second embodiment will be mainly described.

The posture estimation processing of the range image camera in this embodiment has the following steps S1410 and S1420 instead of steps S1210 and S1220 in FIG. 16 of the second embodiment, and the other points are the same. Therefore, the processing flowchart in this embodiment is omitted, and in FIG. 16, steps S 1210 and S 1220 are replaced with the following steps S 1410 and S 1420, and description will be made.

In step S1410, after the head is detected in step S1200, the total number of pixels (point cloud) constituting the subject is calculated from the head coordinates of the subject.

Then, in step S1420, when the number of point cloud calculated in step S1410 is smaller than the threshold value, the range image are transmitted, and in the case where the number of point cloud is larger than the threshold value, it is determined that the posture estimation is performed.

As described above, in the posture estimation system according to this embodiment, when the subject can be difficulty estimated because the number of point cloud is small, the range image data is transmitted to the posture estimation device, and the posture estimation device performs estimation processing with high accuracy. On the other hand, if the subject can be easily estimated because there are enough point cloud, estimation processing is performed in the range image camera. By doing this, there is the effect that the load of the network and that of the posture estimation device can be dispersed.

For example, when the subject is present across the FOV covered by the adjacent range image cameras, in the case that the number of point cloud acquired by each camera is insufficient, range image data is sent from the adjacent sensors to the posture estimation device and integrating them on the world coordinates, it is possible to acquire a sufficient number of point clouds, and it is possible to perform the posture estimation with high accuracy.

Embodiment 5

In this embodiment, furthermore, a point of judging whether or not to perform posture estimation processing in the range image camera under different conditions from the second embodiment will be described. Hereinafter, differences from the second embodiment will be mainly described.

Figure 19:
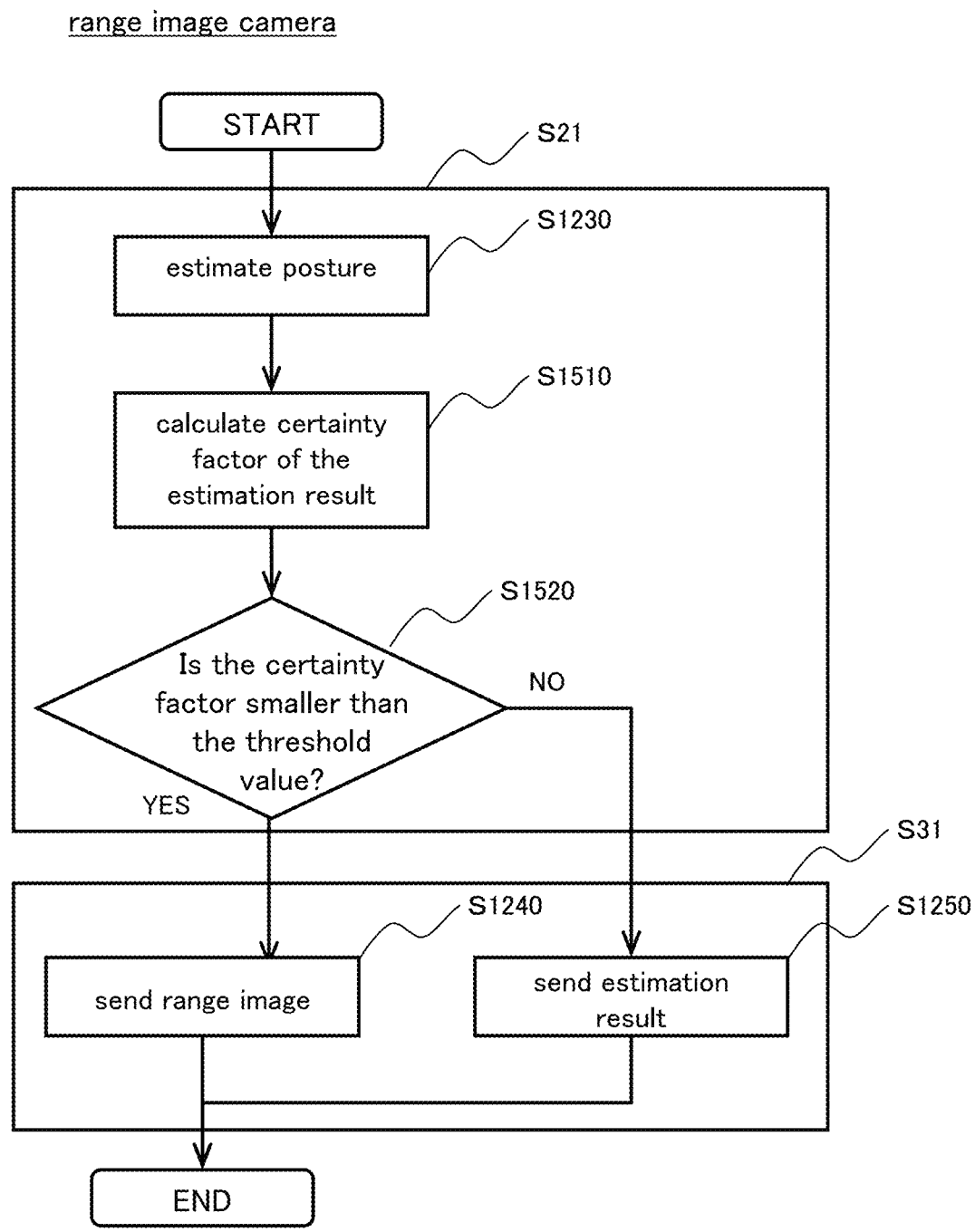
FIG. 19 is a flowchart showing an example of a processing of the posture estimation of the range image camera.

FIG. 19 is a flowchart of the posture estimation processing of the range image camera in the present embodiment. The difference from FIG. 16 is that the order has changed so as to execute the posture estimation processing at the beginning (step S 1230), and steps S 1510 and S 1520 are substituted for steps S 1210 and S 1220.

After posture estimation is executed in step S 1230, certainty factor of the estimation result is calculated (step S 1510). The certainty factor can be obtained by a statistical method.

If the certainty factor calculated in step S1510 is smaller than the threshold value, the distance image is transmitted. If the reliability degree is larger than the threshold value, it is determined that the estimation result is transmitted (step S1520).

As described above, in the posture estimation system according to this embodiment, since the range image data is transmitted only when the certainty factor is low, there is the effect that the network load and the estimation processing load of the posture estimation device can be reduced. Since the certainty factor can be calculated for each posture-estimated part, it is possible to further reduce the network load by extracting and transmitting only the range image data constituting the part with low certainty factor.

Embodiment 6

In this embodiment, description will be given on the point of switching whether to perform posture estimation within the distance image camera for each frame. Hereinafter, differences from the second embodiment will be mainly described.

Figure 20:
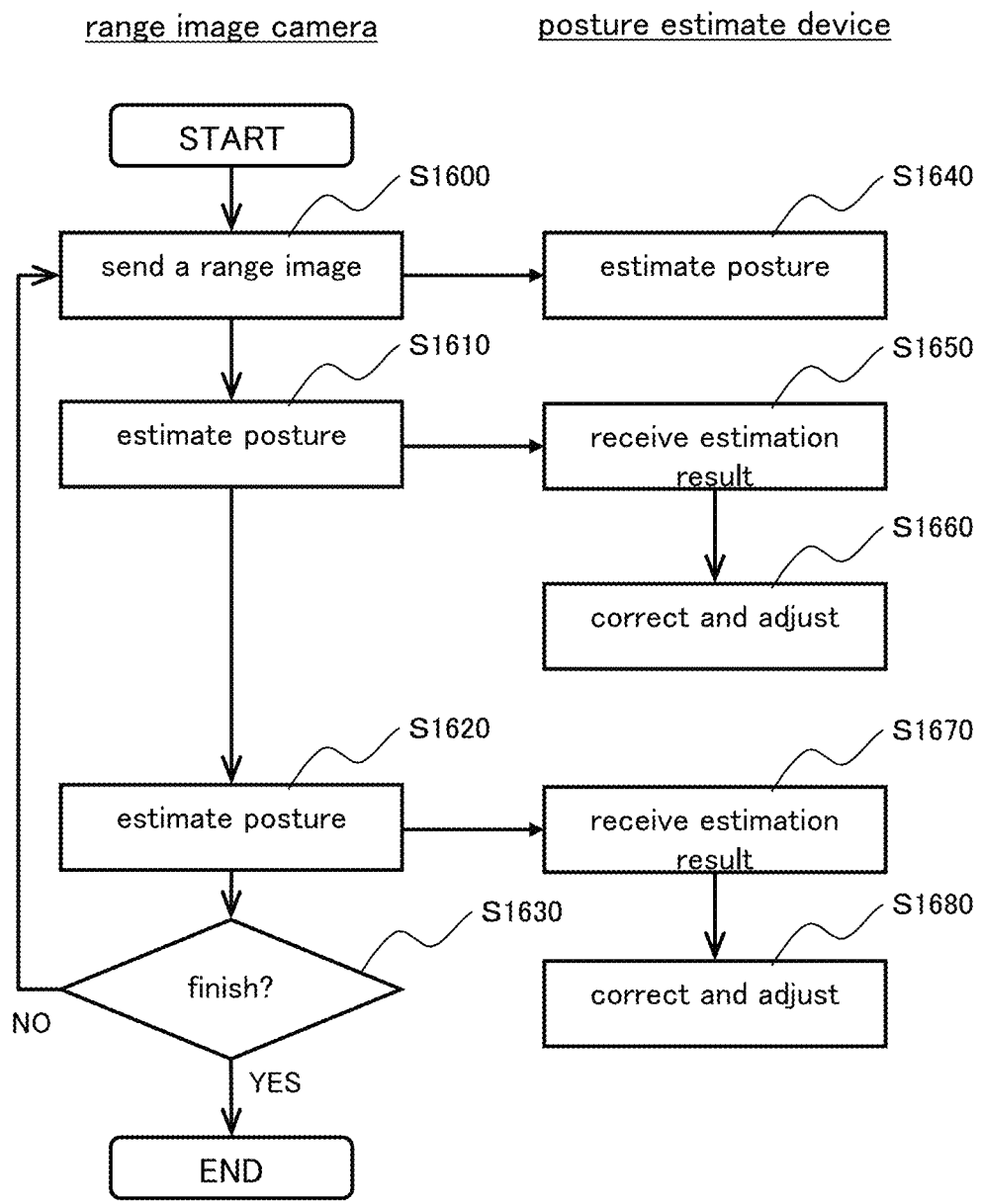
FIG. 20 is a flowchart showing an example of processing of the posture estimation system.

FIG. 20 is a processing flowchart of the posture estimation system according to this embodiment. The flowchart of this figure is repeatedly executed for each range image of one frame. An example will be described in which one posture per three frames is estimated by the posture estimation device 2, two frames per three frames are estimated by the range image camera 1.

In FIG. 20, firstly, the range image camera does not perform the posture estimation processing in the range camera in the processing stage of the first frame, and transmits range image data to the posture estimation device 2 (step S1600).

The posture estimation device 2 receives the distance image data transmitted in step S1600 and executes the posture estimation processing based on the received range image data 1 (step S1640).

Next, in the processing stage of the second frame, the range image camera executes the posture estimation processing in the range camera, and transmits the posture estimation result obtained as a result thereof to the posture estimation device 2 (step S1610).

The posture estimation device 2 receives the result of the posture estimation result transmitted in step S1610 (step S1650).

For received the result of the posture estimation, the joint movement distance based on the result of posture estimation for the first frame estimated in step 1640 is calculated for each joint. Then, the validity of the received result of the posture estimation is evaluated, besides, corrected and adjusted the result of the estimation (step S1660).

As a criterion of the evaluation, for example, a moving distance of the head is calculated from the coordinates of the head estimated in step S1640 and the coordinates of the head coordinates received in step S1650. Then, if it is equal to or less than a threshold value, it is judged to be valid, otherwise it is judged that the estimation result of step S1650 is erroneous estimation.

This threshold may be a distance that the head of a person moves in a time corresponding to one frame (for example, about 33 milliseconds in the case of 30 fps). For example, since the usual walking speed is about 4 kilometers per hour, the moving distance of 33 milliseconds is 37 millimeters, and the value of 37 millimeters can be set as a threshold.

Further, as the distance from the head such as a shoulder or hand increases, and the motion of the subject is larger, the threshold can be set larger to enable appropriate judgment.

If it is judged that it is valid as a result of the evaluation, the estimation result received in step S1650 is adopted, and if it is judged that it is invalid, the coordinates received in step S1650 are corrected based on the result estimated in step S1640.

As a correction method, for example, based on the coordinates of the head estimated in step S1640, a coordinate obtained by reducing the magnitude of a vector heading toward the coordinates of the head received in step S1650 to the magnitude of the threshold is defined as the coordinates of the head.

Next, in the processing stage of the third frame, similarly to step S1610, the range image camera executes the posture estimation processing in the camera and transmits the posture estimation result obtained as a result thereof to the posture estimation device 2 (Step S1620).

As in step S1650, the posture estimation device 2 receives the posture estimation result transmitted in step S1620 (step S1670), and corrects and adjusts as in step S1660 (step S1680).

The range image camera determines whether or not to end (step S1630). If it does not end, the step returns to step S1600 and repeats the processing.

As described above, in the posture estimation system according to this embodiment, range image data are transmitted at a ratio of one frame to three frames, so that the network load can be reduced to one third. Also, the processing load of the posture estimation device can be reduced to two thirds.

Embodiment 7

In this embodiment, generation processing of the feature data is executed by the range image camera, and the part recognizing processing and the joint recognizing processing are executed by the posture estimation device. Hereinafter, differences from the first embodiment will be mainly described.

Figure 21:
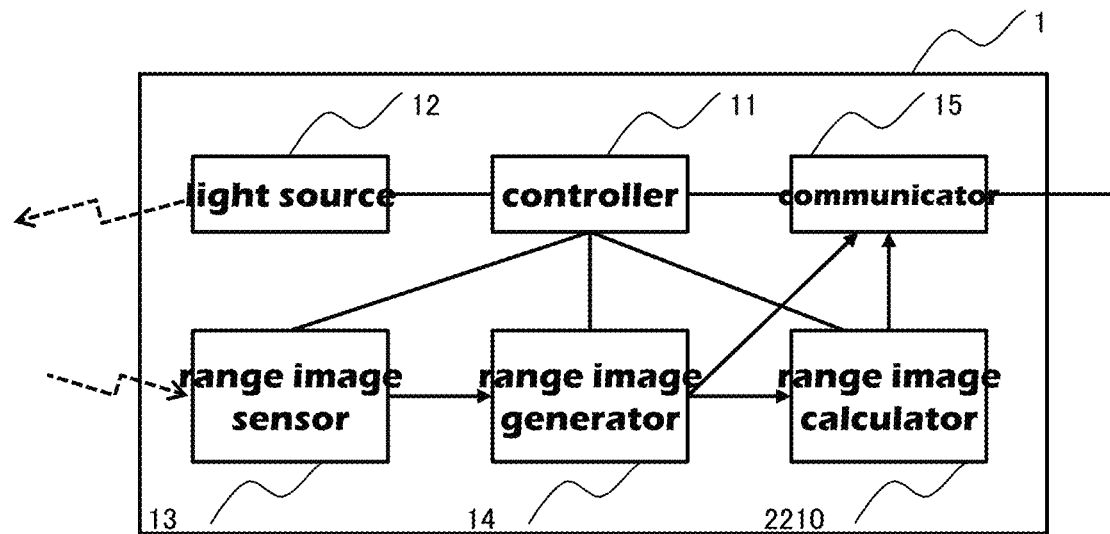
FIG. 21 is a diagram showing an example of a posture estimation system.
Figure 21:
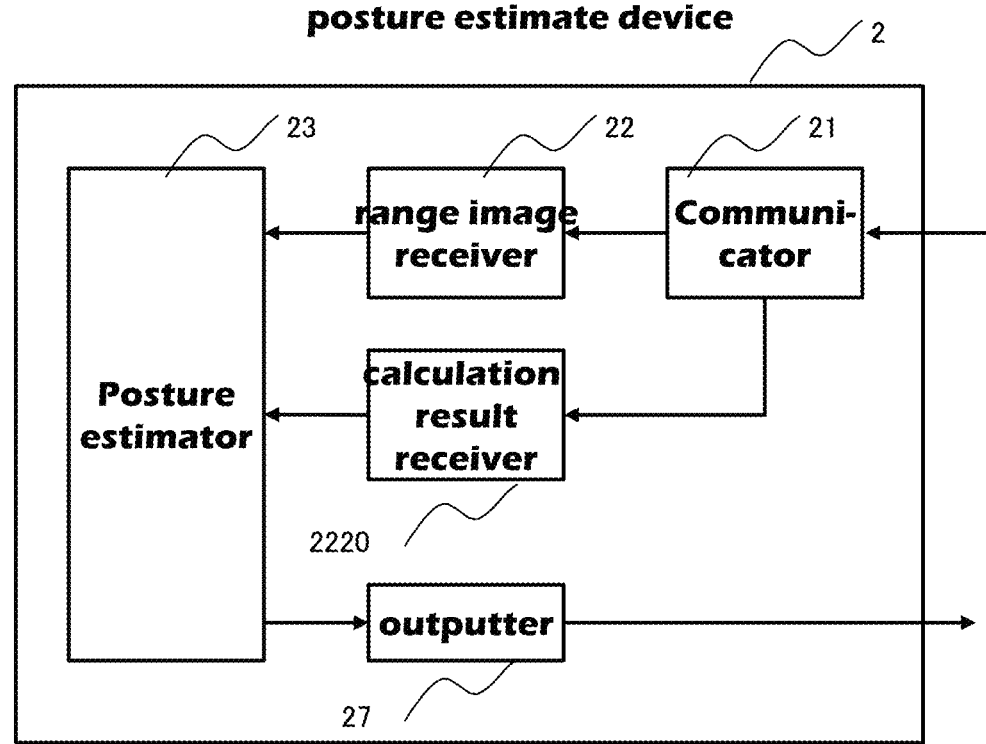

FIG. 21 is a functional configuration diagram of the range image camera and the posture estimation device in this embodiment. The constituent elements of the range image camera and the posture estimation device in this embodiment are the same as those in FIG. 4 except for the range image calculator 2210 and the calculation result receiver 2220.

Figure 22:
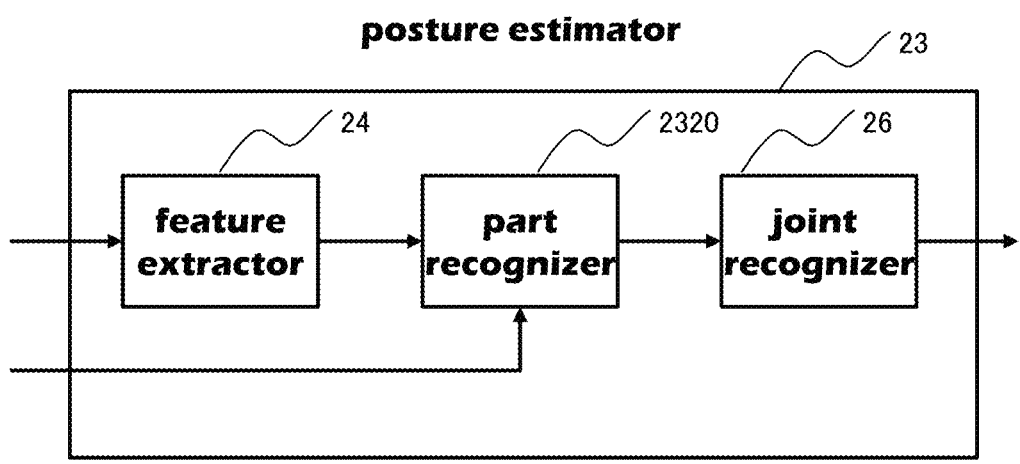
FIG. 22 is a diagram showing an example of a posture estimator of the posture estimation device.

FIG. 22 is a diagram showing a functional configuration example of the posture estimator unit 23. The processing of the posture estimator unit 23 is the same as the processing of the range image camera described in FIG. 14, other than there are two systems of inputs to the parts recognizer 2230.

Figure 23:
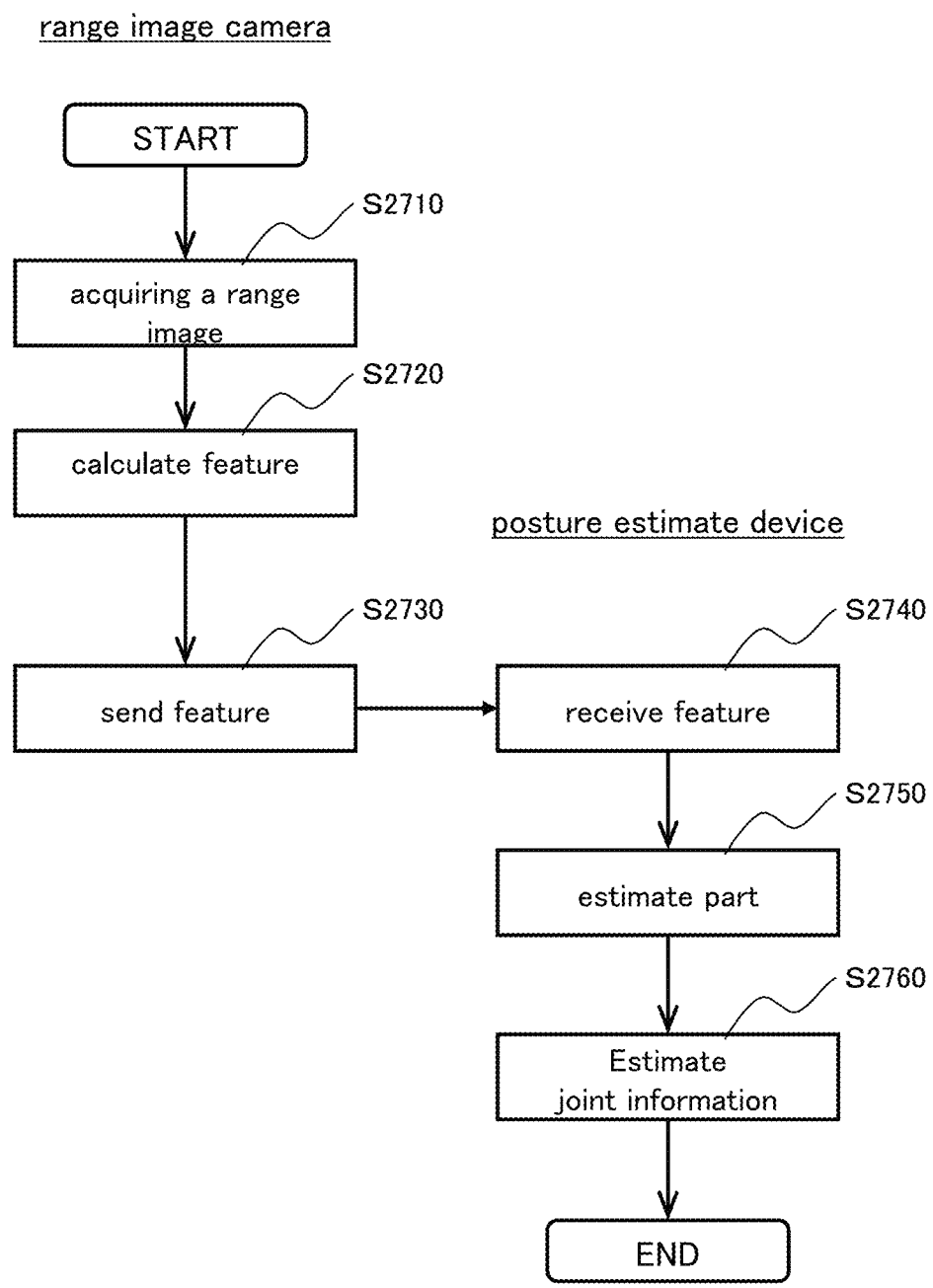
FIG. 23 is a flowchart showing an example of a processing of posture estimation of the posture estimation system.

FIG. 23 is a processing flowchart of the posture estimation system according to the present embodiment. The flowchart of this figure is executed for each range image of one frame.

In FIG. 23, the range image generator 14 of FIG. 21 generates range image data and outputs them to the range image calculator 2210 (step S 2710).

The range image calculator 2210 calculates and generates feature data from the range image data generated by the range image generator 14 (step S 2720).

As the feature data, for example, 8 surrounding pixels are selected for one featured pixel of the range image data. Then, difference data of the distance between the featured pixel and each of the surrounding 8 pixels are used as eight-dimensional vector data and considered as a feature data.

When the range image of one frame is configured of N pixels, the (8×N) dimensional vector data becomes feature data.

Figure 24:
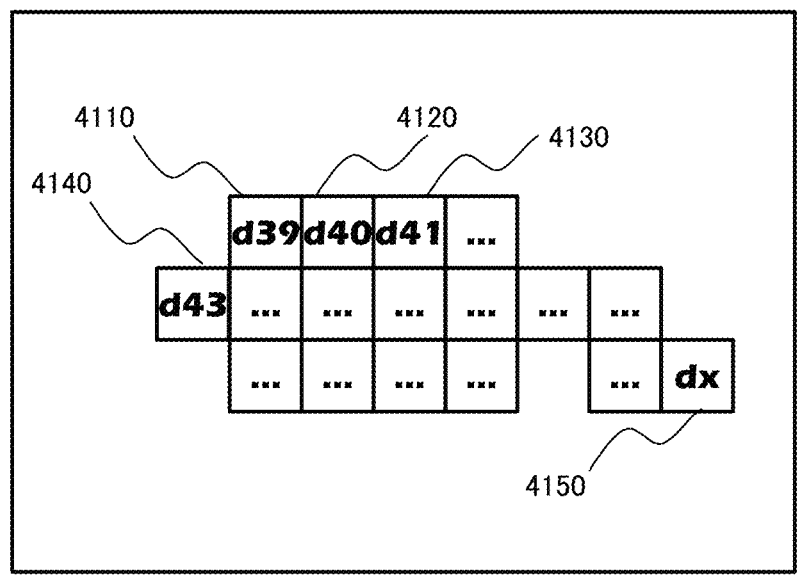
FIG. 24 is a diagram showing an example of an image of range image data.

For example, as shown in FIG. 24, one featured pixel is selected with respect to range image data configured by pixels in order from the pixel 4110 having the range data d 39, the pixel 4120, the pixel 4130, to the pixel 4150 having the range data dx.

Figure 25:
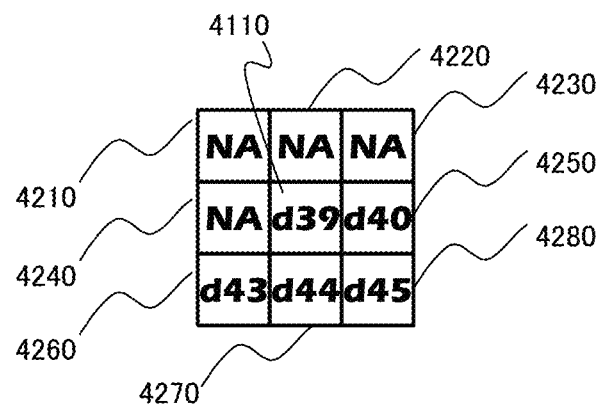
FIG. 25 is a diagram showing an example of feature.

Then, as shown in FIG. 25, for example, 8 pixels surrounding the featured pixel 4110 are selected as pixels 4210, 4220, 4230, 4240, 4250, 4260, 4270, 4280. Here, for example, the pixel 4250 is the same pixel as the pixel 4120, and the pixel 4260 is the same pixel as the pixel 4140.

Figure 26:
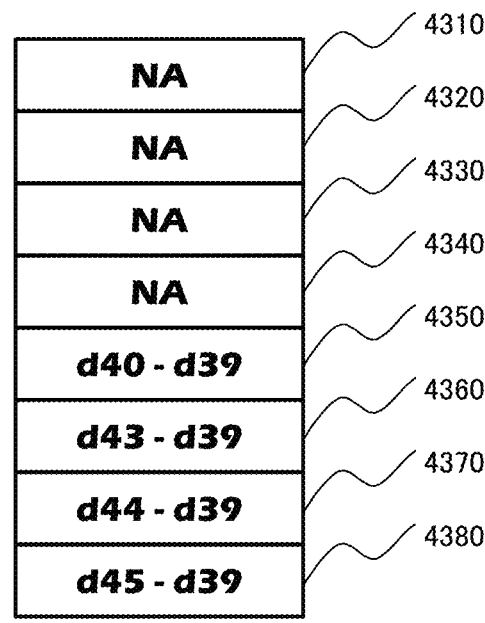
FIG. 26 is a diagram showing an example of data format of the feature vectors.

As a result, as shown in FIG. 26, eight-dimensional vector data can be generated. In FIG. 26, although the difference data 4310, 4320, 4330, and 4340 are described as "NA". "NA" means a case where the pixels do not have valid range data, for example, it corresponds to a case where it is not a foreground pixel. In this case, for example, by defining NA to contain −1, it can be indicated that it is invalid data. The difference data 4350 is the difference between the range data d 40 of the surrounding pixel 4120 and the distance data d 39 of the featured pixel 4110. Similarly, the difference data 4360, 4370, 4380 are the differences between the range data of the surrounding pixels 4260, 4270, 4280 and the featured pixel 4110.

Figure 27:
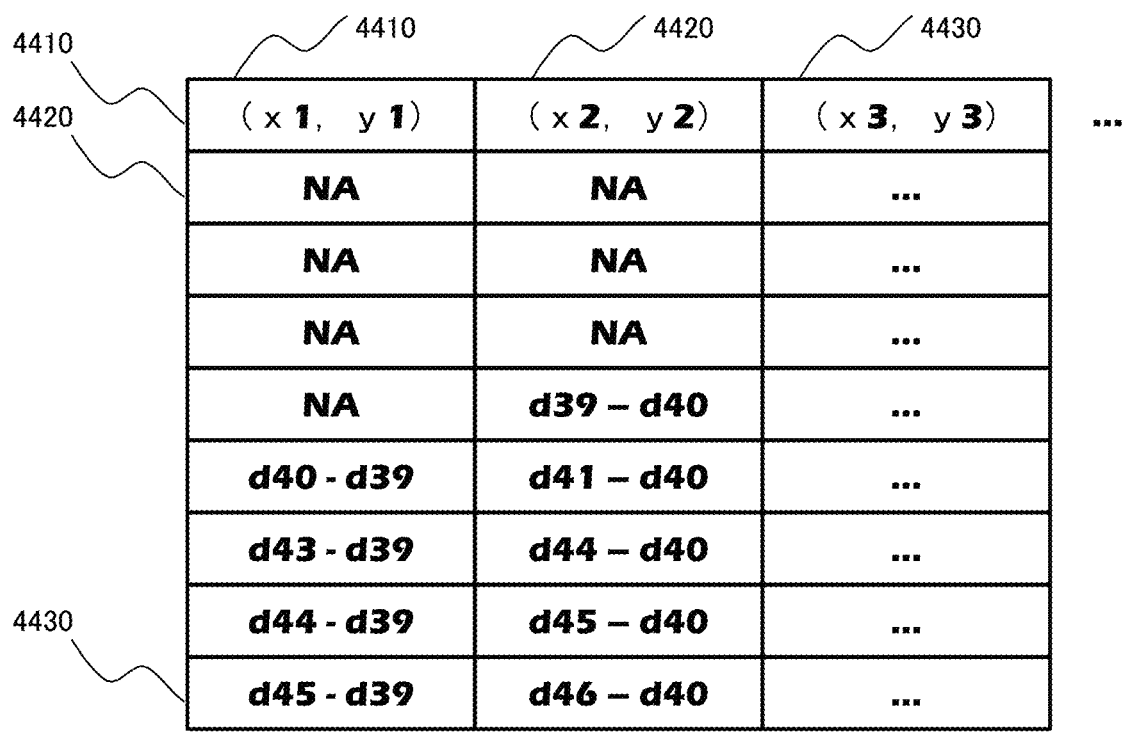
FIG. 27 is a diagram of example of data format of the feature data.

As shown in FIG. 27, 8-dimensional feature vector data are calculated for all the pixels from the pixel 4110 to the pixel 4150, then, the calculated feature vector data are set as the feature data of the frame together with the coordinate data. For example, the feature data composed of the XY coordinates of the pixel 4110 and an 8-dimensional feature vector are in column 4410. The feature data composed of XY coordinates of the pixel 4120 and an 8-dimensional feature vector is in column 4420. Likewise the above, the feature data composed of XY coordinates and 8-dimensional feature vectors are in column 4430 and columns after 4430. The XY coordinates of each pixel are in the row 4410. The 8-dimensional feature vector of each pixel are in from the row 4420 to the row 4430. Here, for example, the 8-dimensional feature vector of the pixel 4120 is the same as the data shown in FIG. 26.

In FIG. 23, the range image calculator 2210 of FIG. 21 transmits the feature data generated in step S 2720 to the posture estimation device 1 via the communicator 15 (step S 2730).

The calculation result receiver 2220 of FIG. 21 inputs the feature data received from the range image camera 1 to the posture estimator 23 via the communicator 21.

The range image calculator 2210 transmits the feature data calculated in step S 2720 to the posture estimation device 1 via the communicator 15 (step S 2730).

The calculation result receiver 2220 receives the feature data input from the range image camera via the communicator 21, and outputs it to the part recognizer 2230 (step S 2750). The feature data are the same as the feature data calculated by the range image calculator 2210. This is a process corresponding to step S52 in FIG. 17.

The part recognizer 2230 in FIG. 22 receives the feature data input from the calculation result receiving section 2220, calculates the part recognizer result by executing the part recognition, outputs the part recognition result to the joint recognizer 2330 (Step S2750).

This is a process corresponding to step S53 in FIG. 17.

The joint recognizer 2330 in FIG. 22 executes joint recognition from the part recognition result input from the part recognizer 2230 and outputs the joint recognition result to the outputter 27 (step S 2760). This is a process corresponding to step S55 in FIG. 17.

As described above, in the posture estimation system according to this embodiment, among the estimation processing, feature vector extraction as preprocessing is performed by the range image camera and post processing is performed by the posture estimation device. Thus, since the calculation of the feature data is executed by the range image camera, the processing load of the posture estimation device can be reduced correspondingly.

Embodiment 8

In this embodiment, range image data converting processing is executed in the range image camera, and voxel generating processing and joint identifying processing are executed in the posture estimation device. Hereinafter, differences from the seventh embodiment will be mainly described.

Figure 28:
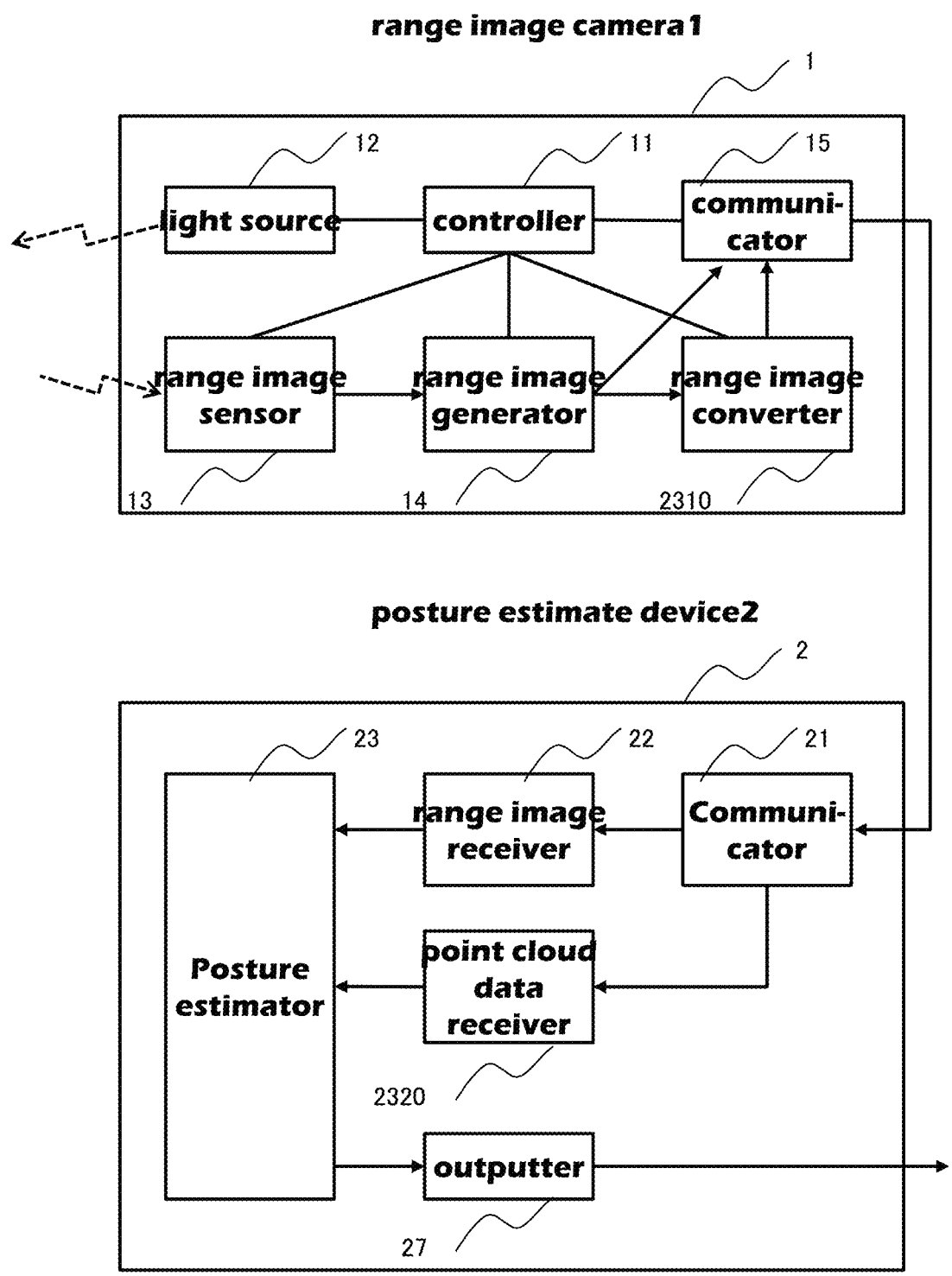
FIG. 28 is a functional block diagram showing an example of a range image camera and the posture estimation device.

FIG. 28 is a functional block diagram of the range image camera and the posture estimation device in this embodiment. In FIG. 28, parts other than the range image converter 2310 and the point cloud data receiver 2320 are the same as in FIG. 21 of the seventh embodiment.

Figure 29:
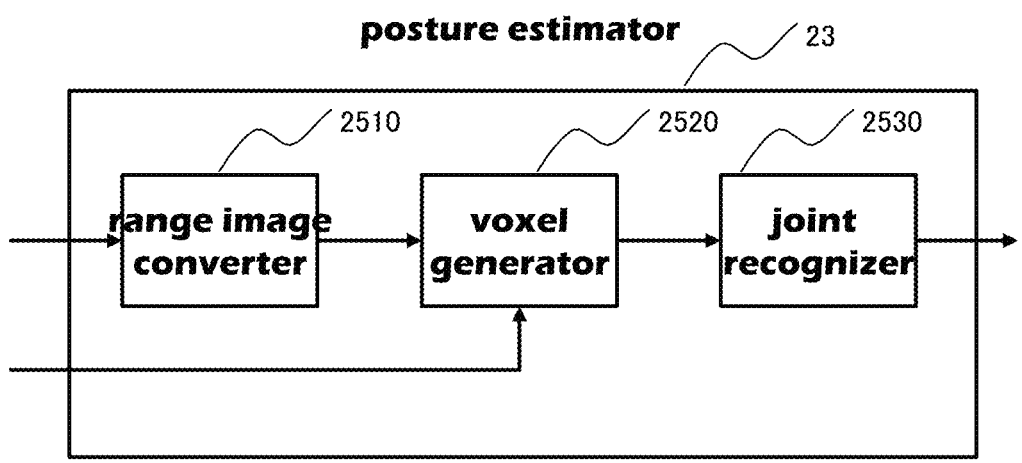
FIG. 29 is a diagram showing an example of posture estimator of the posture estimation device.

FIG. 29 is a diagram showing a functional configuration example of the posture estimator 23. The posture estimator 23 comprises the range image converter 2510, the voxel generator 2520, and the joint recognizer 2530.

Figure 30:
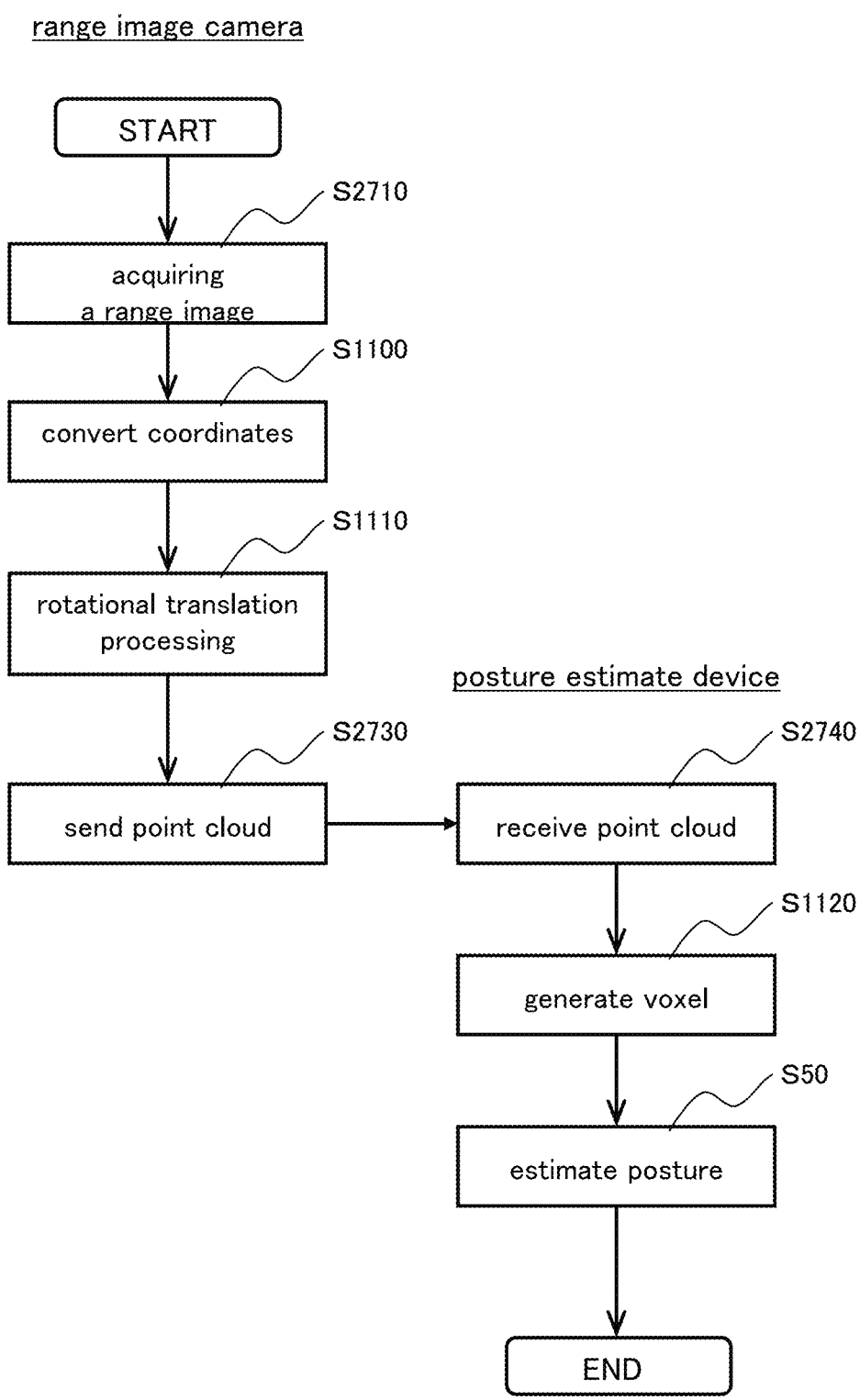
FIG. 30 is a flowchart showing a processing of posture estimation on the posture estimation system.

FIG. 30 is a flowchart of a processing of the posture estimation system according to this embodiment. This flowchart is executed for each range image of one frame.

In FIG. 30, the range image converter 2310 of FIG. 28 converts coordinate of the range image data generated in step S 2710. This is the same process as step S 1100 in FIG. 9.

Next, the range image converter 2310 performs rotation processing for the range image data converted in step S 1100. This is the same process as step S 1110 in FIG. 9. Further, translational processing may be performed as necessary. For example, if the installation position of the camera is not defined as the origin of the world coordinates, performing processing to translate to the origin may be effective in reducing the processing cost.

Finally, the range image converter 2310 transmits distance image data (=point cloud data) converted in step S 1110 to the posture estimation device via the communicator 15 (step S 2730).

The point cloud data receiver 2320 receives the point cloud data transmitted in step S 2730 (step S 2740) and outputs it to the voxel generating unit 2520.

The voxel generator 2520 generates voxel data. This is the same process as step S 1120 in FIG. 9. Then, the voxel generator 2520 outputs the generated voxel data to the joint recognizer 2530.

The joint recognizer 2530 performs posture estimation processing based on the voxel data. This is the same process as step S 50 in FIG. 3.

As described above, in the posture estimation system according to this embodiment, since the coordinate conversion processing and the rotational translation processing of the range image data are executed by the range image camera, the processing load of the posture estimation device can be reduced correspondingly.

Although the embodiments of the present invention have been described above, the present invention is not limited to the above-described embodiments, but includes various modifications.

For example, in the above embodiment, in the case where the number of recognizers in the posture estimator 23 is one, even when the installation posture of the range image camera or the attitude of the target with respect to the range image camera changes, that is, when the imaging angle changes, if the same classifier is used, there is a possibility that the accuracy of the identification of the part or the joint is deteriorated.

Therefore, the posture estimator 23 may learn and store a plurality of classifiers according to the imaging angle in advance, and may select the classifier to be used according to the actual imaging angle.

For example, the posture estimator 23 may receive the imaging angle of the range image camera from the user via the communicator or the input device, or the imaging angle may be determined based on the shape of the marker or the like captured in the range image and the position of the foreground pixel.

The posture estimator 23 may also change the method of calculating the feature according to the imaging angle.

Further, a database for storing range image may be connected to the network N, each range image camera may transmit the range image to the database and accumulate, and the posture estimation device may acquire the range image from the database.

Further, the range image generator 14 may cut out an area including the foreground pixels without deleting the background from the input range image.

Further, in the above embodiment, the subject is mainly a human body, but it is not limited thereto. In addition to the human body, if it is a moving object having certain restrictions and ranges in the length of the skeleton and the movable range of the joint, such as humanoid robots, industrial robot arms, animals such as monkeys or gorillas, etc.

Further, the configurations of the range image camera and the posture estimation device shown in the above embodiments are classified according to the main processing contents in order to make the configuration of these devices easy to understand. The present invention is not limited by the manner and name of classification of constituent elements. The configuration of the range image camera and the posture estimation device can be further classified into more components depending on the processing contents. Also, one component can be categorized to perform more processing. In addition, the processing of each component may be executed by one piece of hardware or may be executed by a plurality of pieces of hardware. In addition, the process or function assignment of each constituent element is not limited to the one shown in the drawings as long as the object and effect of the present invention can be achieved.

In addition, the processing unit of the flowchart shown in the above embodiment is divided according to the main processing contents in order to make the processing of the range image camera and the posture estimation device easy to understand. The present invention is not limited by the manner and name of division of processing units. The processing of the range image camera and the posture estimation device can be divided into more processing units according to the processing contents. It is also possible to divide one processing unit to include more processing. Furthermore, as long as the objects and advantages of the present invention can be achieved, the processing order of the above flowchart is not limited to the illustrated example.

Further, each of the above-described embodiments has been described in detail in order to explain the present invention in an easy-to-understand manner, and the present invention is not necessarily limited to one having all the constituent elements described above. In addition, a part of the configuration of an embodiment can be replaced by the configuration of another embodiment, and the configuration of another embodiment can be added to the configuration of an embodiment. Further, it is possible to add, delete, and replace other configurations with respect to part of the configuration of each embodiment.

In addition, each of the above-described configurations, functions, processing units, processing means, and the like may be realized by hardware, for example, by designing some or all of them with an integrated circuit or the like. In addition, each of the above-described configurations, functions, and the like may be realized by software by interpreting and executing a program that realizes the respective functions by the processor.

Further, the present invention can be applied not only to the posture estimation system, the posture estimation device, and the range image camera, but also to a computer readable program, a posture estimation system, a posture estimation device, or a range image, a method of processing in a camera, and the like.

The invention claimed is:

1. A posture estimation system comprising:
   a range image camera for acquiring a first range image and outputting a second range image; and
   an attitude estimation device connected via a network to the range image camera,
   wherein the range image camera includes
      a range image sensor that acquires the first range image,
      a range image generator that extracts a region including foreground pixels from the first range image acquired from the range image sensor without background pixels and generates the second range image including the extracted region,
      a first posture estimator that estimates a first joint position from the second range image, and
      a first communicator that transmits the second range image and the estimated first joint position, wherein the first posture estimator includes a second communicator that receives the second range image from the range image camera and the first joint position, and a range image receiver that receives the second range image via the second communicator,
      a second posture estimator that estimates a second joint position different from the first joint position based on the second range image received by the range image receiving unit, and generates estimated posture information based on the first joint position and the second joint position, and
      an outputter that outputs the generated estimated attitude information, and
   wherein the first communicator sends a range image used for extracting the second joint position to the network;
   wherein the first and second posture estimators comprise:
      a feature extractor that calculates a feature of a featured pixel from the foreground pixels;
      a part recognizer that acquires a part label of the featured pixel based on the feature calculated by the feature extractor; and
      a joint recognizer that acquires a center-of-gravity position for each part based on the region label of each featured pixel recognized by the part recognizing section and determines the joint position based on the acquired center-of-gravity position of each part.

2. The posture estimation system according to claim 1, wherein the first communicator transmits a third range image excluding the first joint position from the second range image.

3. The posture estimation system according to claim 1, wherein the second range image is a range image of a person and the first joint position and the second joint position are person's joint positions.

4. The posture estimation system according to claim 1, wherein the first communicator transmits the coordinates of the first joint position.

5. A posture estimation device connected to a range image camera via a network, comprising:
   a communicator for receiving a range image and a first joint position from the range image camera;
   a range image receiver that receives the range image via the communicator;
   a posture estimator that estimates a second joint position different from the first joint position based on the range image received by the range image receiving unit, and generates estimated posture information based on the first joint position and the second joint position; and
   an outputter that outputs the generated estimated attitude information
   wherein the posture estimator comprises:
      a joint inputter receives the first joint position input from the range image camera via the communicator;
      a feature extractor that calculates a feature of a featured pixel from the foreground pixels of the range image;
      a part recognizer that acquires a part label of the featured pixel from the feature calculated by the feature extractor;
      a parts recognizer that acquires a center-of-gravity position for each part based on a part label of each featured pixel recognized by the part recognizer and determines a joint position for determining the second joint position based on the acquired center-of-gravity position of each part; and
      a joint integrator that integrates coordinates based on the second joint position recognized by the joint recognizer and the first joint position input to the joint inputter.

6. The posture estimation device according to claim 5, wherein the posture estimator comprises:
   a joint inputter that receives the first joint position input from the range image camera via the communication unit;
   a range image converter that converts foreground pixels of the range image input via the communicator;
   a voxel generator for generating voxel data from the foreground pixels converted by the range image converter;
   a joint recognizer for identifying the second joint position from the voxel data generated by the voxel generator; and
   a joint integrator for integrating coordinates based on the second joint coordinate identified by the joint recognizer and the first joint coordinate input to the joint inputter.

7. A range image camera for acquiring and outputting a distance image, comprising:
   a range image sensor that acquires a first range image;
   a range image generator that extracts a region including foreground pixels based on the first range image acquired from the range image sensor without background pixels and generates a second range image including the extracted region;
   a posture estimator that estimates a joint position from the second range image; and
   a communicator that transmits a third range image excluding the estimated joint position from the second range image and the estimated joint position to the outside;
   wherein the posture estimator comprises:
      a feature extractor that calculates a feature of a featured pixel from the foreground pixels;
      a part recognizer that acquires a part label of the featured pixel based on the feature calculated by the feature extractor; and
      a joint recognizer that acquires a center-of-gravity position for each part based on the region label of each featured pixel recognized by the part recognizing section and determines the joint position based on the acquired center-of-gravity position of each part.

8. The range image camera according to claim 7, wherein the posture estimator comprises:
   a range image converter for transforming coordinate of the foreground pixels;
   a voxel generator that converts the foreground pixels converted by the range image converter into voxel data; and
   a joint identifying unit for searching the voxel data converted by the voxel generator to estimate the joint position.

* * * * *